Oct. 8, 1935.  A. H. SCHMIDTKE  2,016,562
METHOD OF AND APPARATUS FOR MAKING RECEPTACLES
Filed March 6, 1933   14 Sheets-Sheet 1

Inventor:
Albert H. Schmidtke
By Eugene M. Giles
Atty.

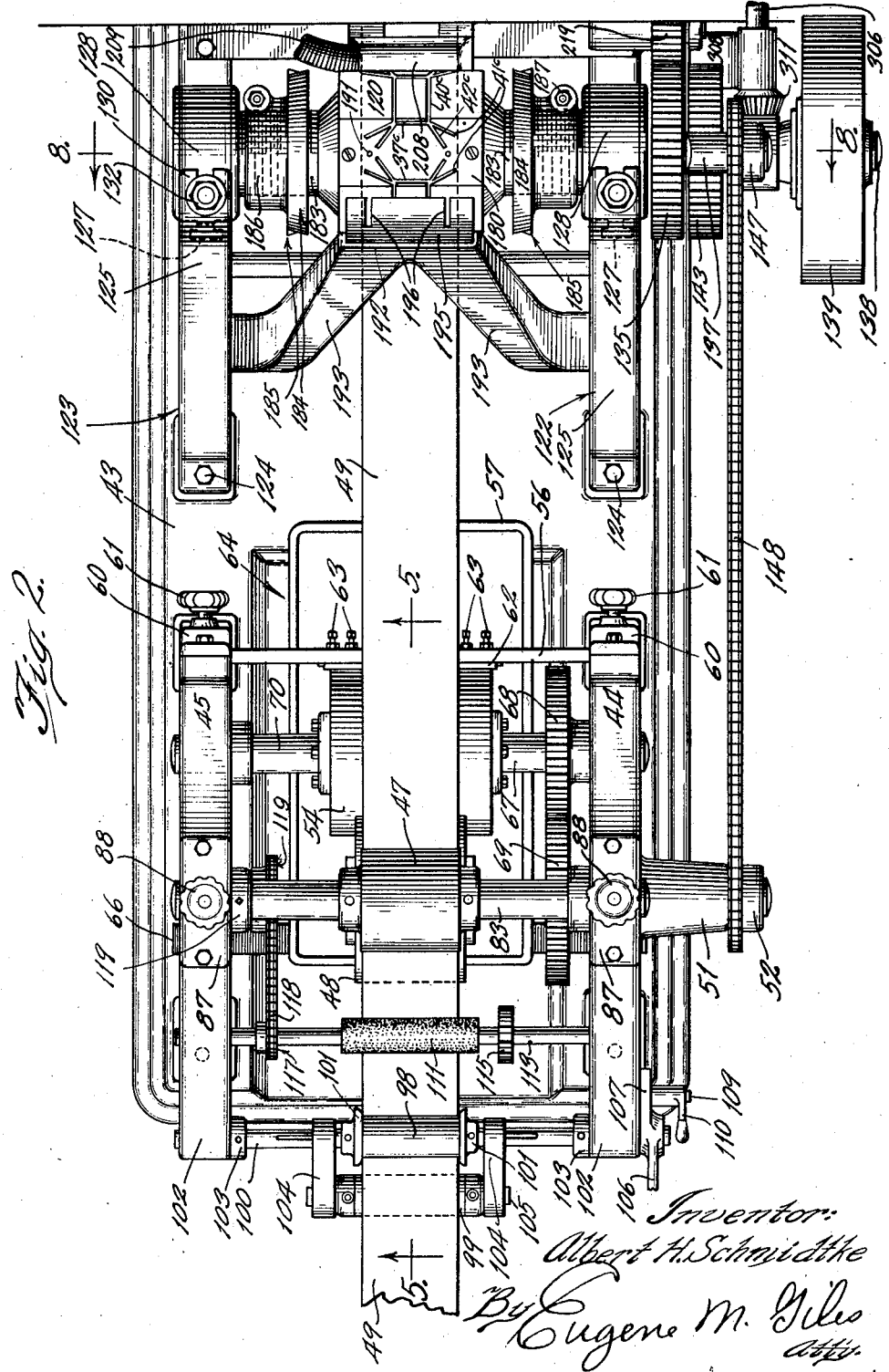

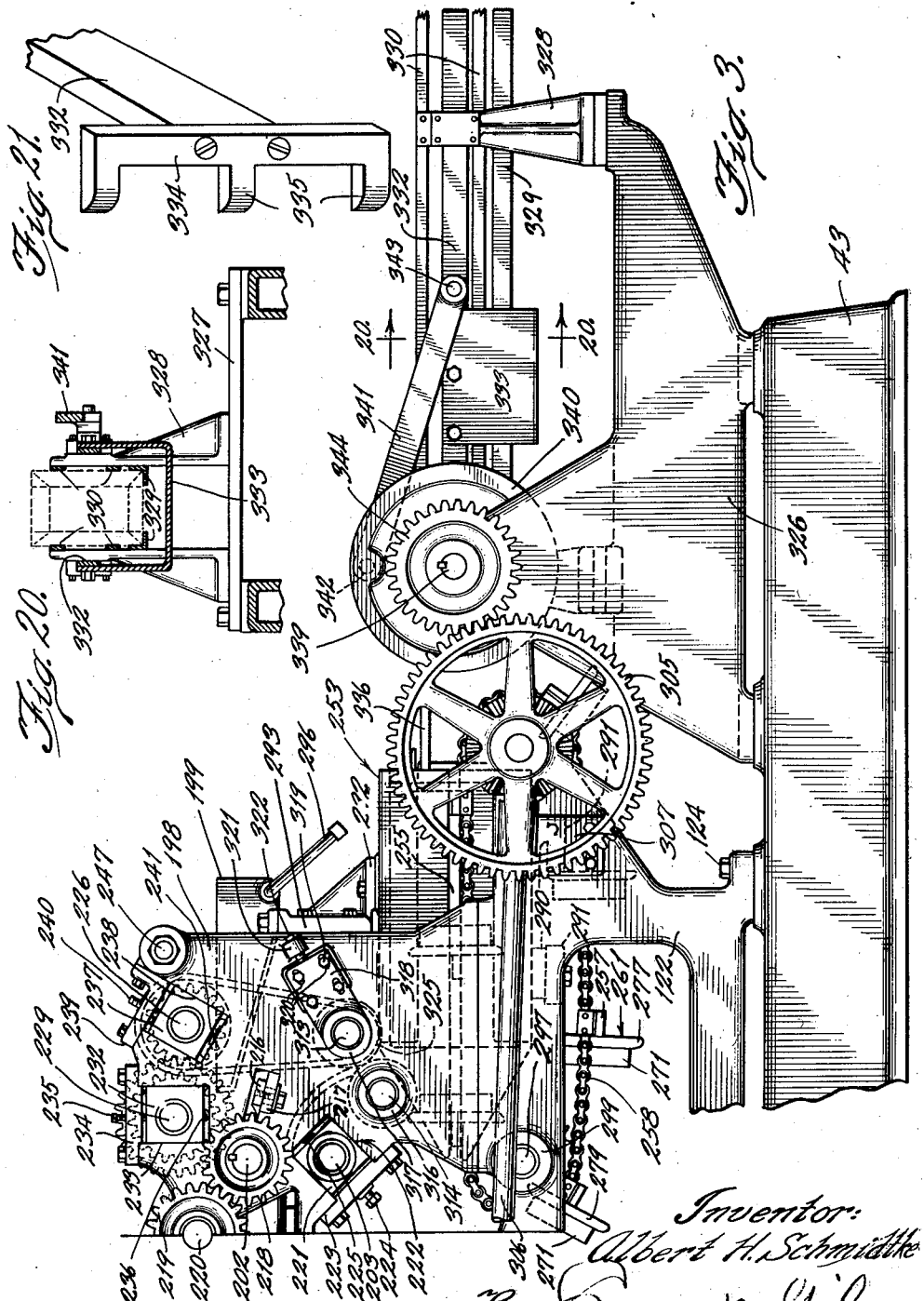

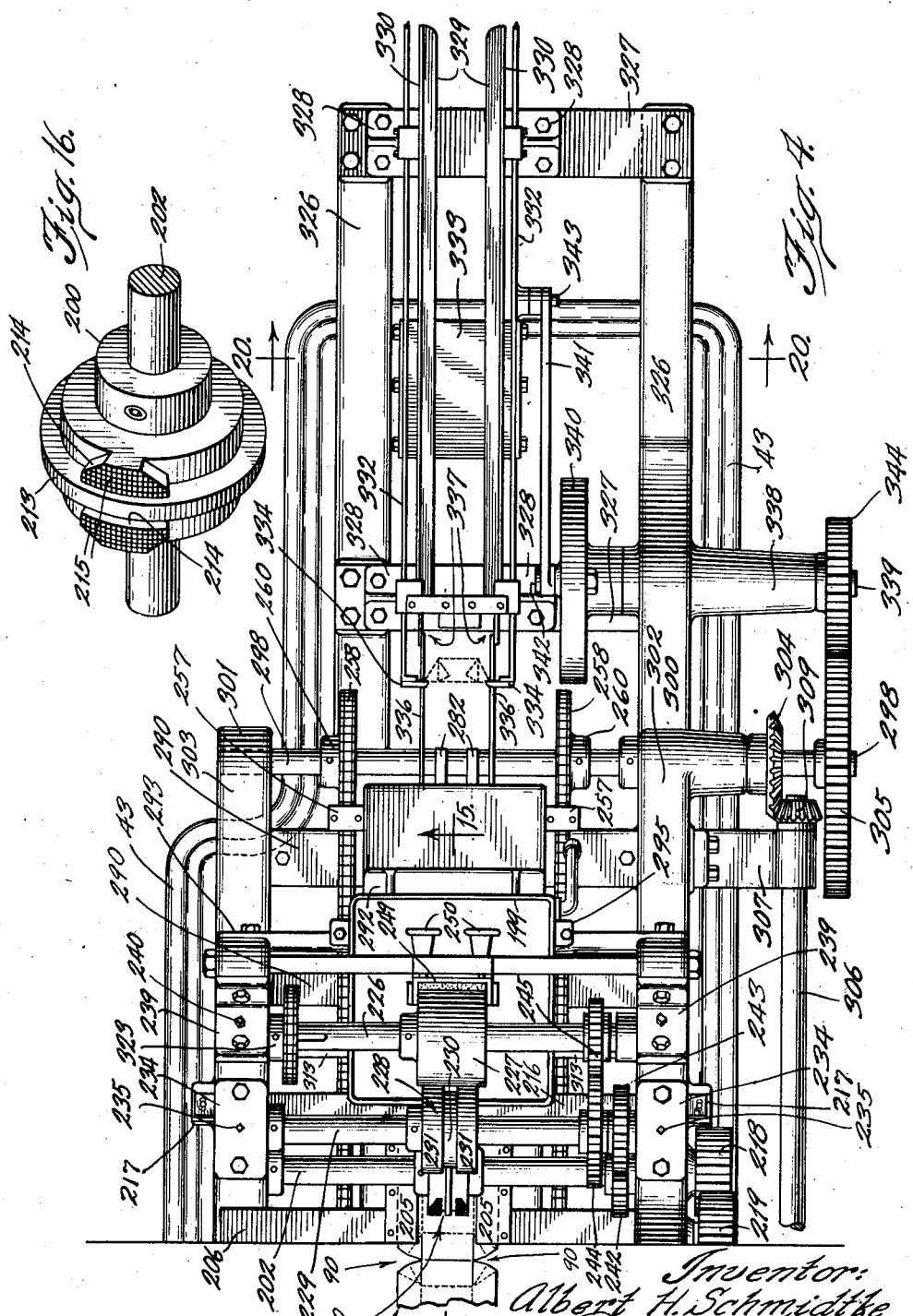

Oct. 8, 1935.   A. H. SCHMIDTKE   2,016,562
METHOD OF AND APPARATUS FOR MAKING RECEPTACLES
Filed March 6, 1933   14 Sheets-Sheet 5
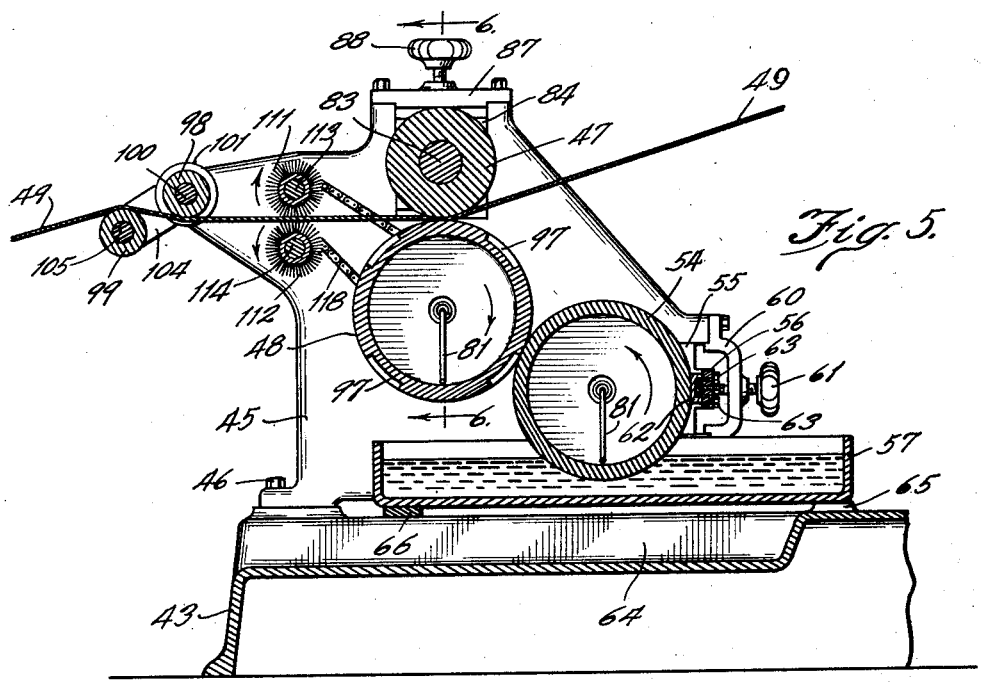

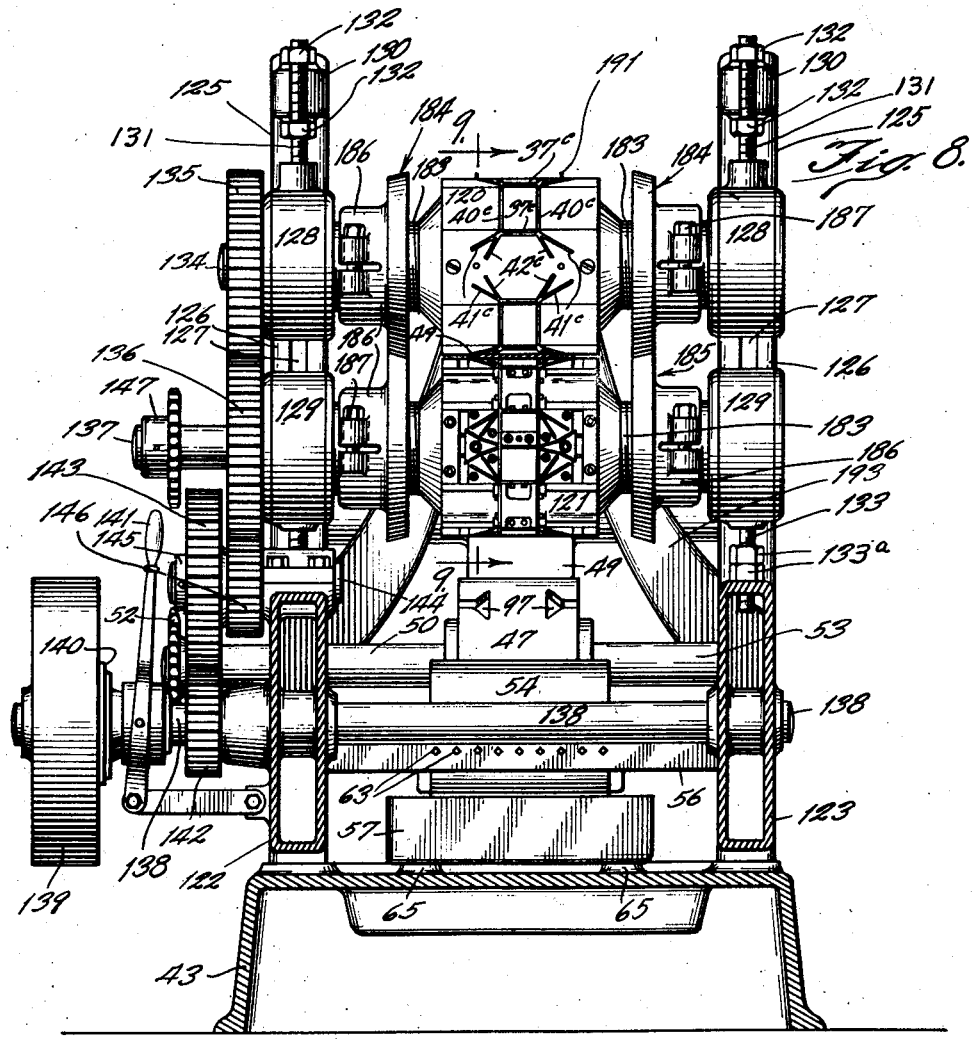

Oct. 8, 1935. A. H. SCHMIDTKE 2,016,562
METHOD OF AND APPARATUS FOR MAKING RECEPTACLES
Filed March 6, 1933 14 Sheets-Sheet 7
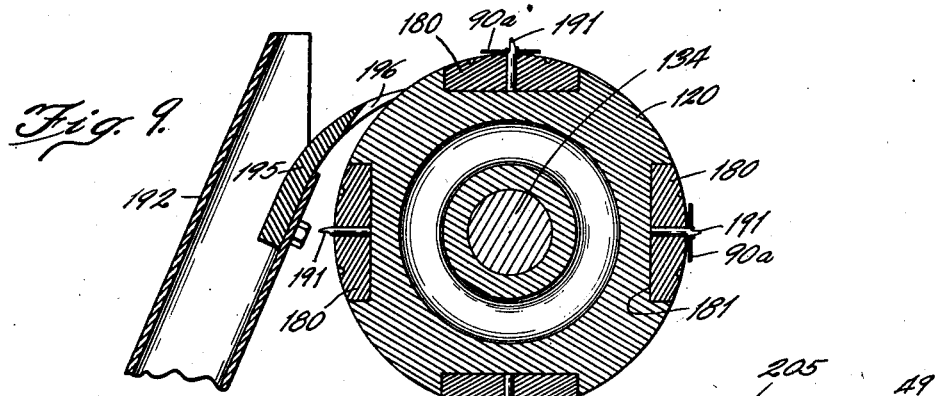
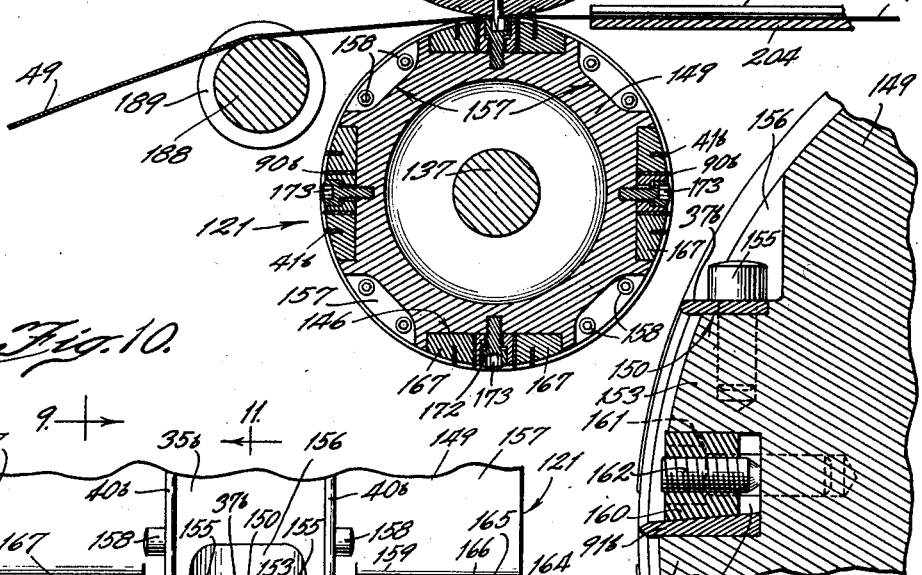
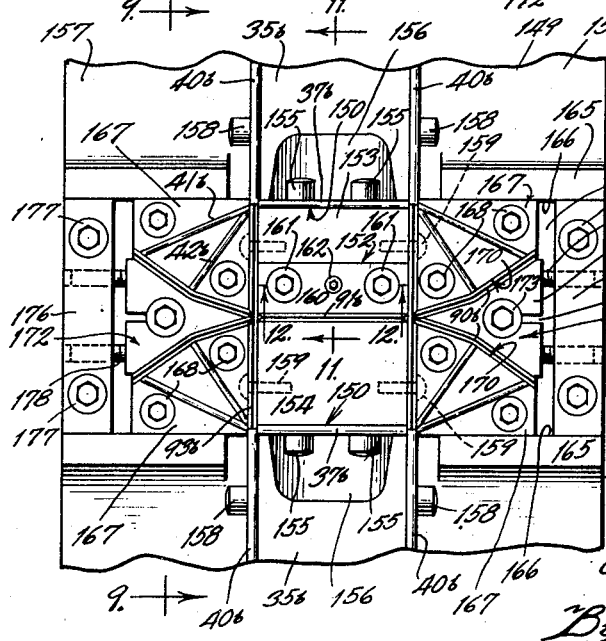
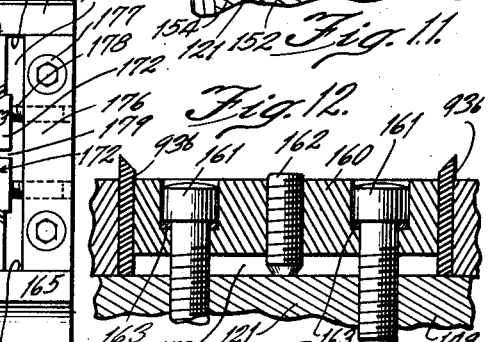

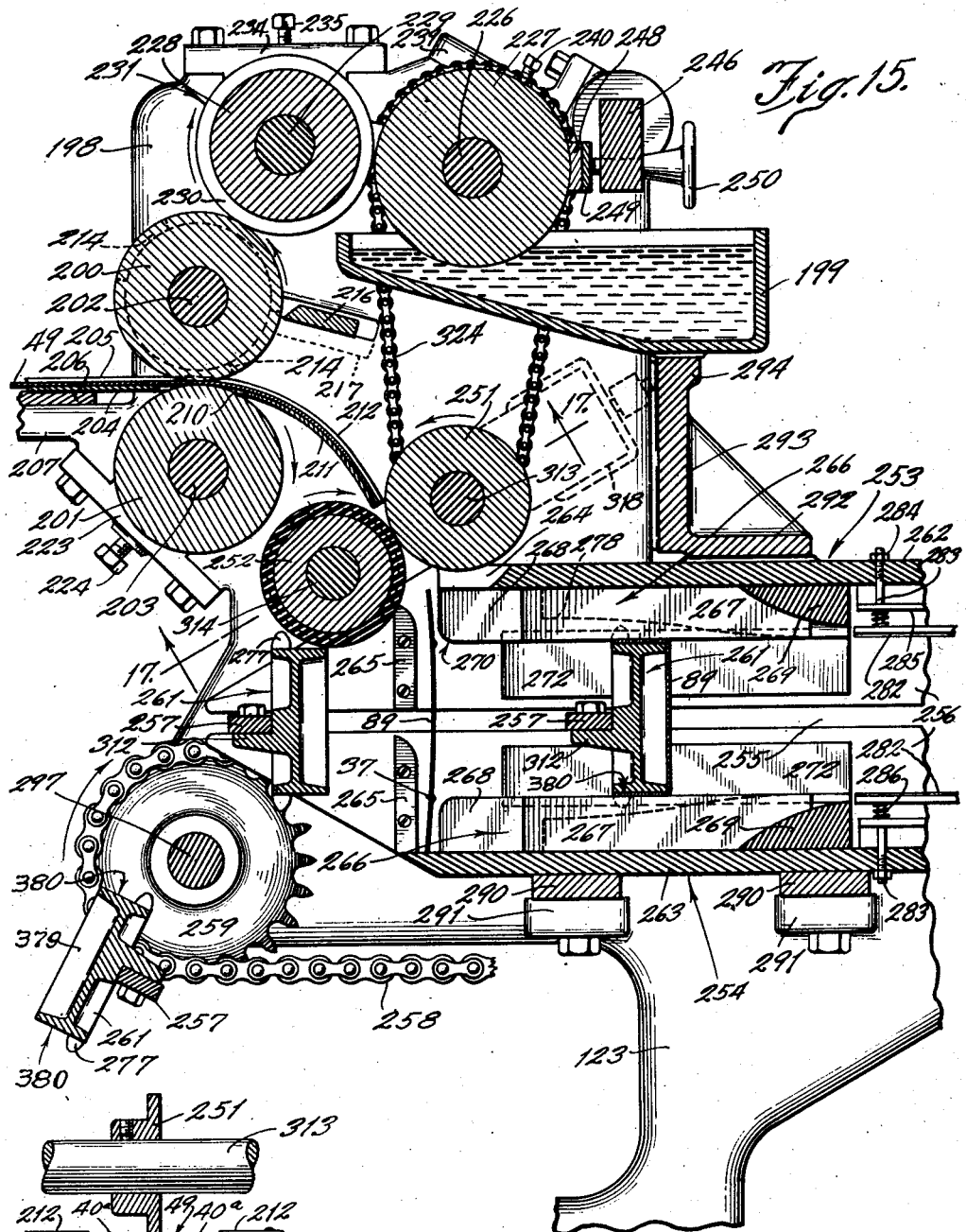
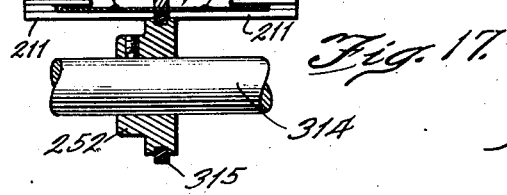

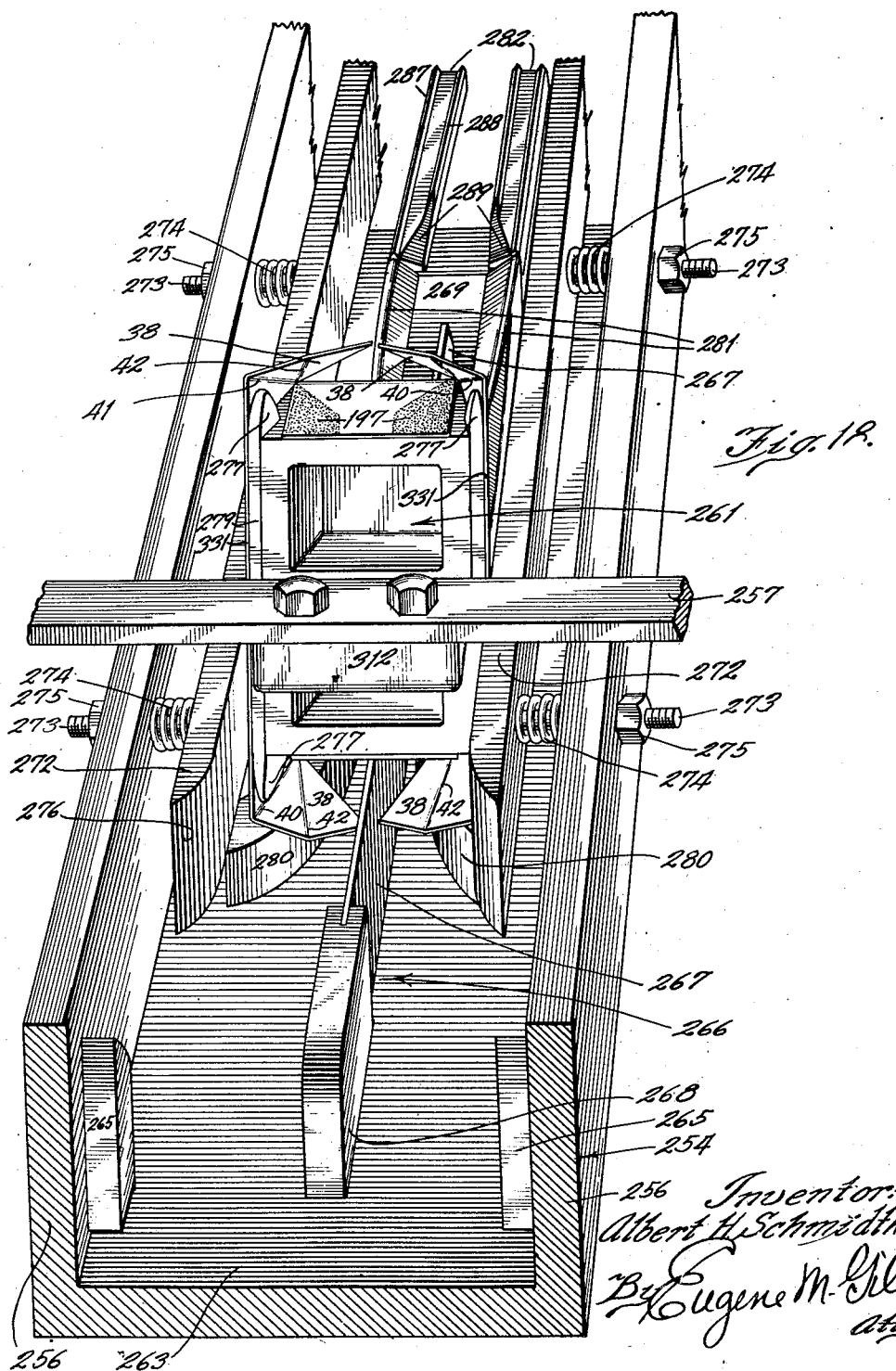

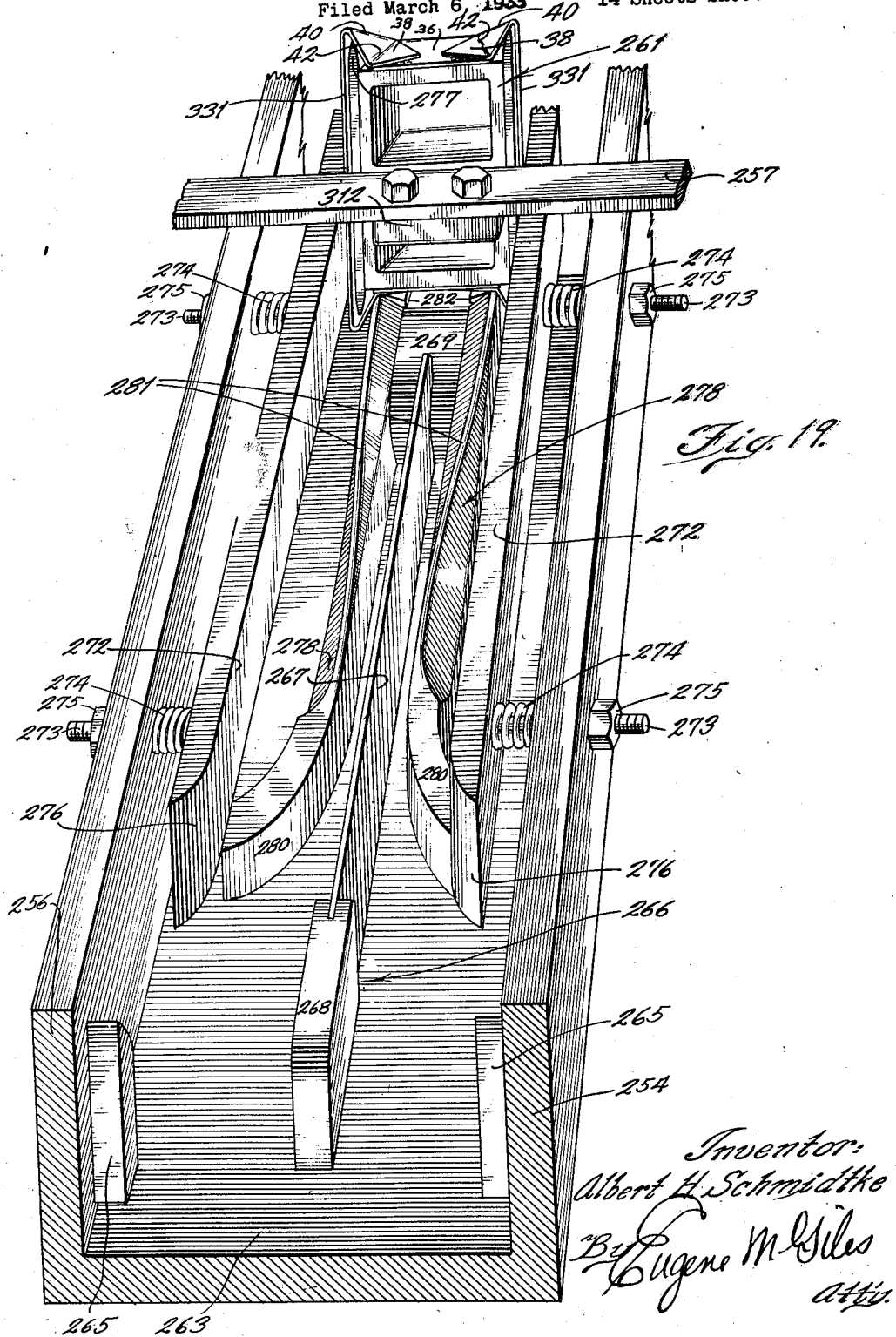

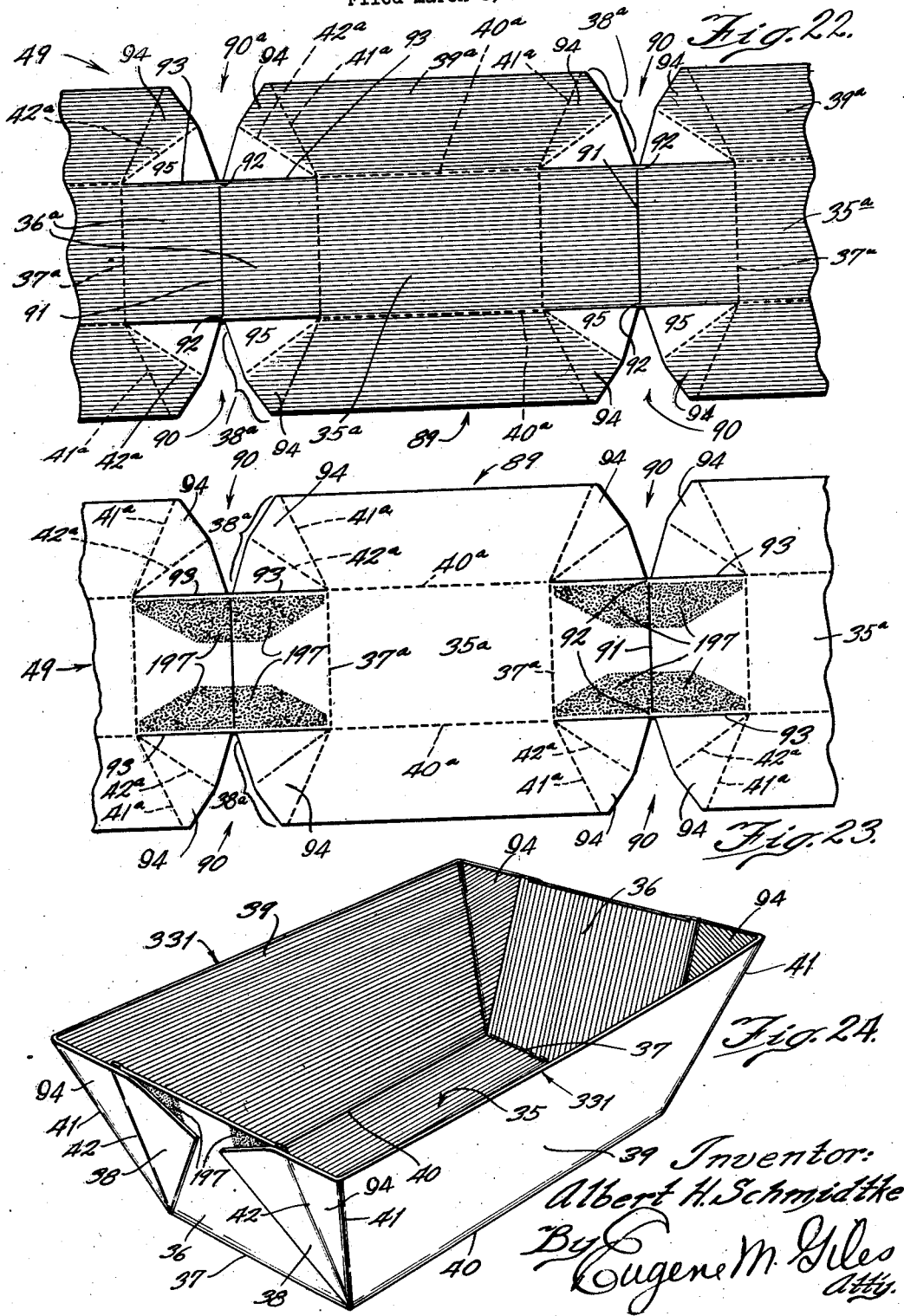

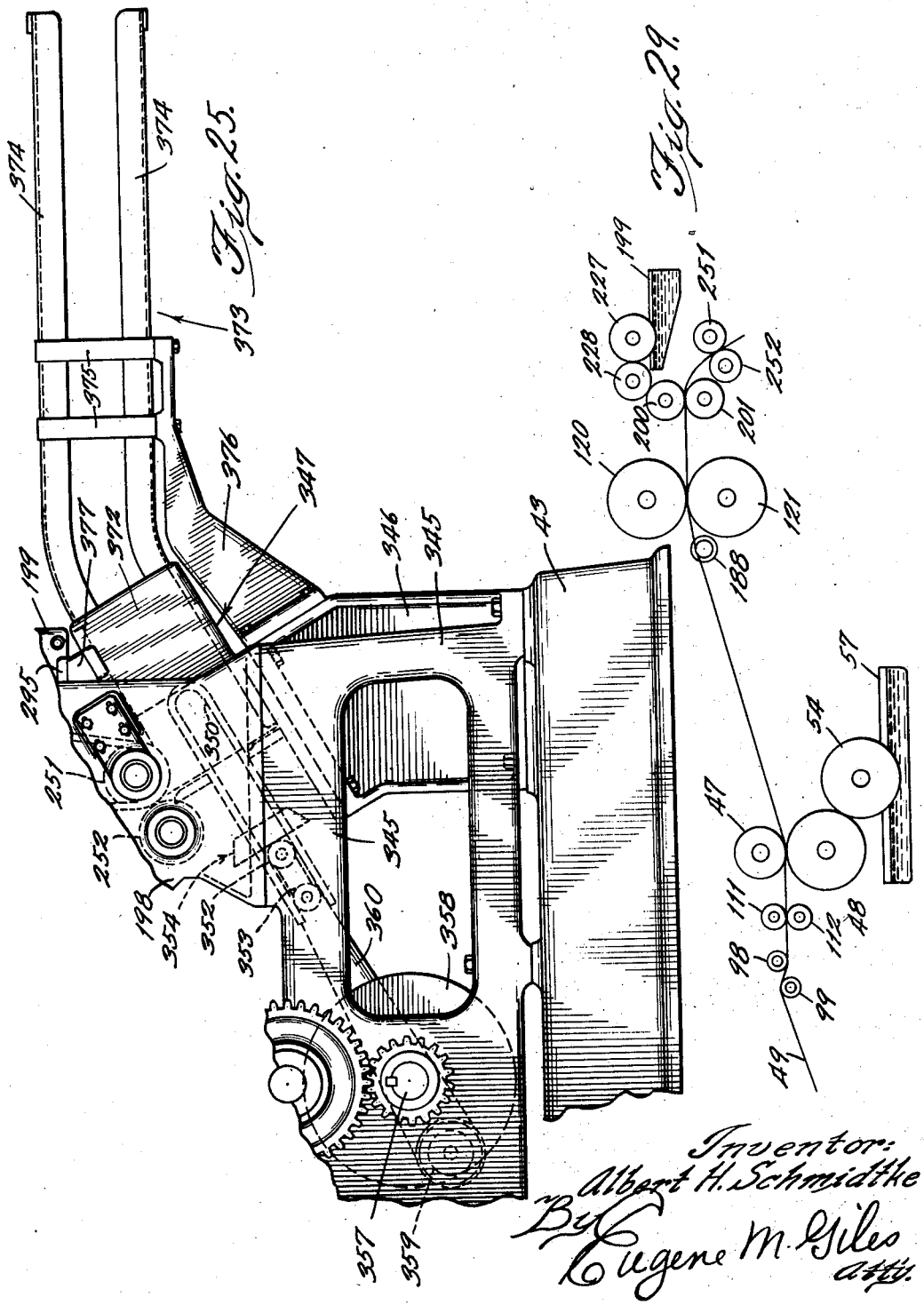

Oct. 8, 1935.  A. H. SCHMIDTKE  2,016,562
METHOD OF AND APPARATUS FOR MAKING RECEPTACLES
Filed March 6, 1933   14 Sheets-Sheet 13
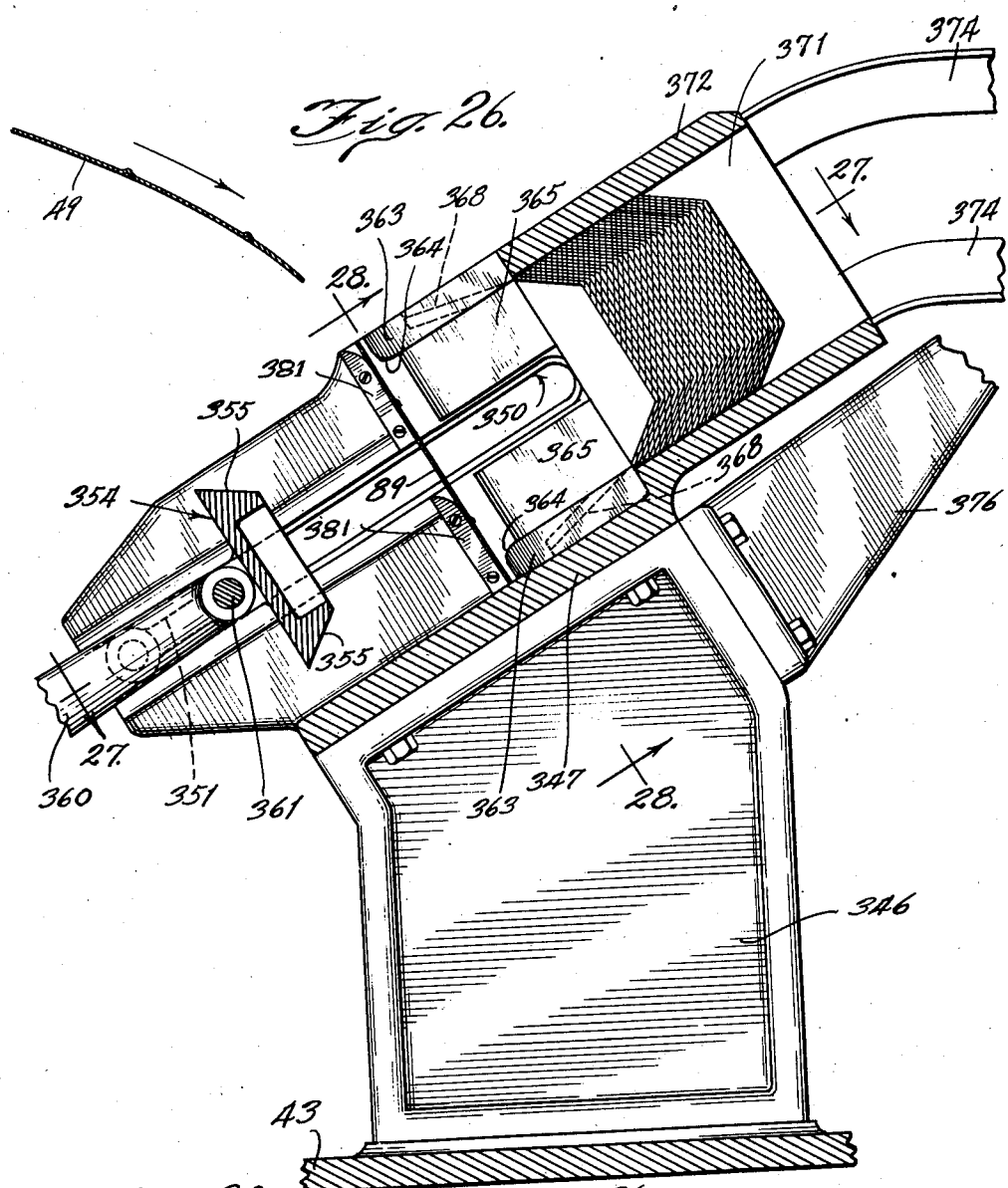
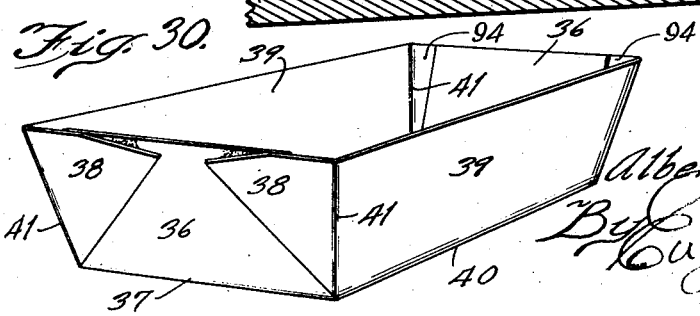
Inventor:
Albert H. Schmidtke
By Eugene M. Giles
Atty.

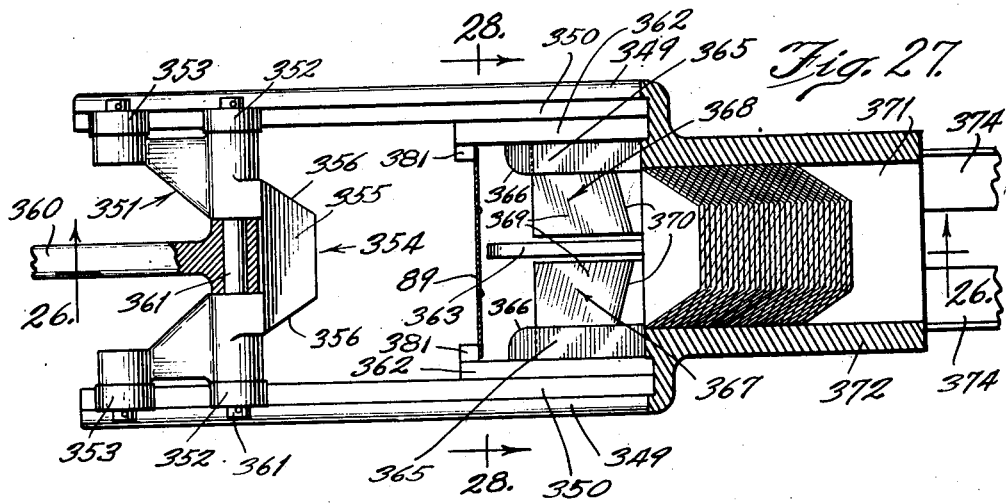
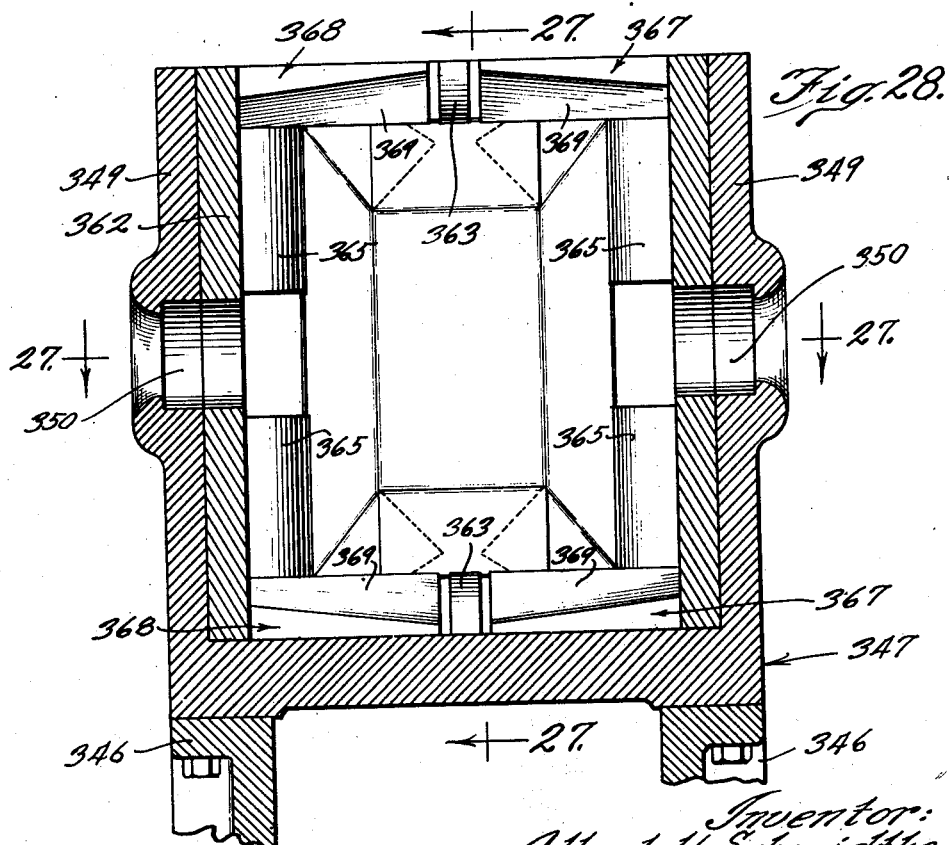

Patented Oct. 8, 1935

2,016,562

UNITED STATES PATENT OFFICE 2,016,562

METHOD OF AND APPARATUS FOR MAKING RECEPTACLES

Albert H. Schmidtke, St. Joseph, Mich., assignor to St. Joseph Iron Works, St. Joseph, Mich., a corporation of Michigan Application March 6, 1933, Serial No. 659,689

10 Claims. (Cl. 93—47)

My invention relates to the manufacture of dish like paper receptacles of the character commonly employed in stores for dispensing butter and other commodities to customers, and has reference more particularly to a method of and apparatus for making such receptacle.

The principal objects of my invention are to provide improved apparatus and an improved method for making dishes or receptacles of paper or the like; to adhesively unite in a rapid and efficient manner portions of a blank of paper or other similar material so as to produce a dish like receptacle; to insure complete and permanent sealing of the seams or joints so that the receptacle will not leak; to provide a method and apparatus whereby the receptacles are automatically produced in a rapid and continuous manner from a strip of paper; to provide improved devices for paraffining, cutting and scoring, gluing and shaping the paper; to utilize the nesting of the cartons for holding the folded blanks in the dish form and for pressing the glued parts together while the glue sets, this being accomplished in a manner to insure uniform receptacles and expedite production; to minimize the cost of receptacles of this character, and to produce a neat and exceptionally satisfactory butter dish or the like which nests more compactly and is more convenient for storage and transportation than other receptacles of this character, these and other objects being accomplished by the apparatus shown in the accompanying drawings in which, Figs. 1 and 2 are side and plan views respectively of approximately one half of the length of the machine and show the receiving end or what is hereinafter considered as the front end of the machine;

Figs. 3 and 4 are side and plan views respectively of the other half of the length of the machine and show the delivery end or what is hereinafter considered as the rear end of the machine;

Fig. 5 is a sectional view on the line 5—5 of Fig. 2 showing the waxing mechanism and other adjacent parts;

Fig. 6 is an enlarged sectional view on the line 6—6 of Fig. 5 taken through the roll which applies the wax to the paper;

Fig. 7 is a perspective view of the roll of Fig. 6;

Fig. 8 is a transverse sectional view of the machine taken substantially on the lines 8—8 of Figs. 1 and 2 and shows particularly the cutting and scoring rolls;

Fig. 9 is an enlarged detail sectional view of the cutting and scoring rolls taken on the line 9—9 of Fig. 8, the line on which this section is taken being also indicated by the line 9—9 in Fig. 10;

Fig. 10 is an enlarged view of a peripheral portion of the surface of the main cutting and scoring roll and shows one of the four groups of cutting and scoring elements for preparing adjoining ends of two carton blanks;

Figure 1:
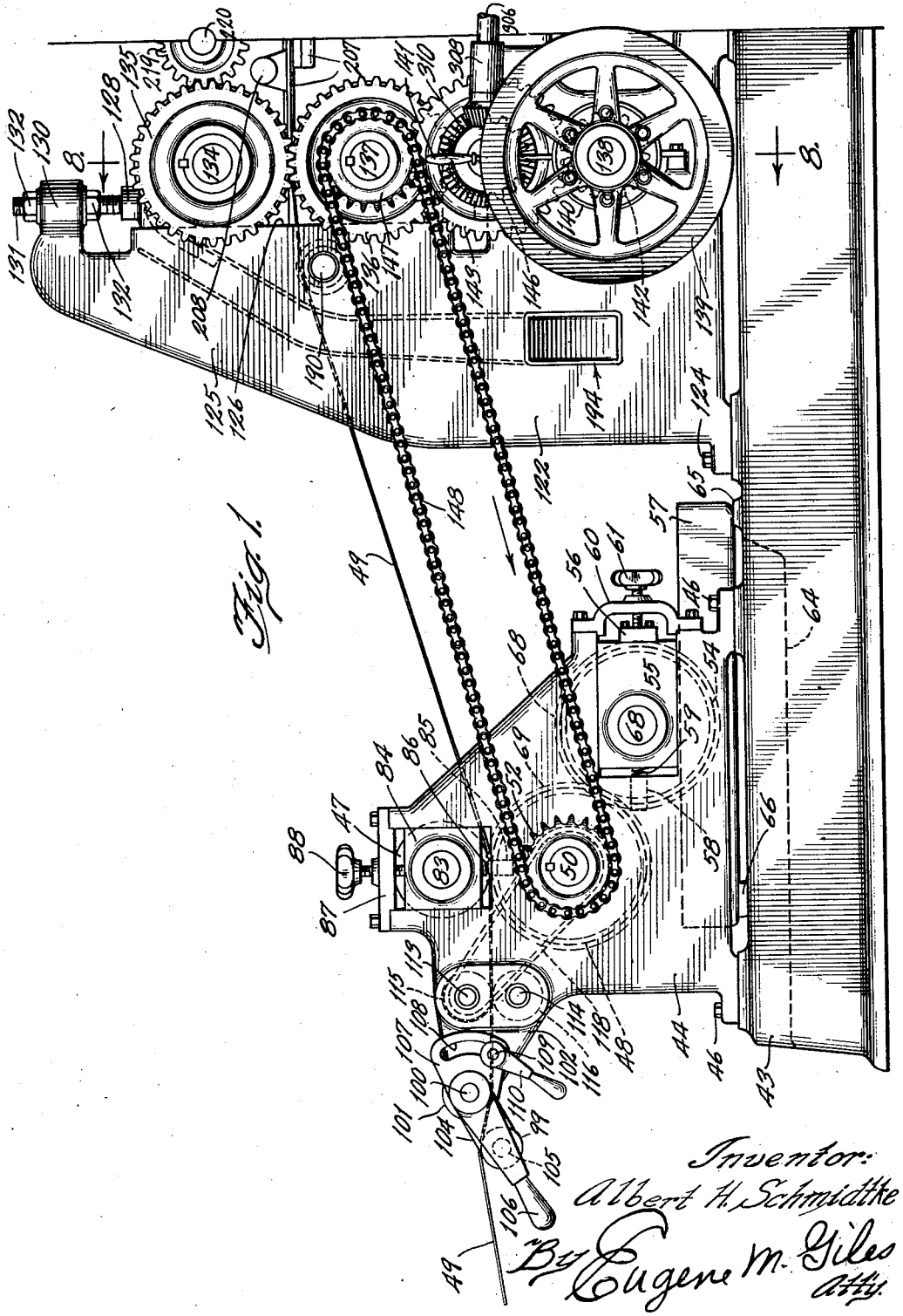

Figs. 11 and 12 are enlarged detail sectional views, on the lines 11—11 and 12—12 respectively of Fig. 10;

Figs. 13 and 14 are enlarged perspective views of clamping and cutter holding blocks constituting a part of the assembly of Fig. 10;

Fig. 15 is an enlarged longitudinal sectional view of a part of the delivery end portion of the machine taken on the line 15—15 of Fig. 4 and shows the gluing and forming mechanisms;

Fig. 16 is a perspective view of the roll for applying the glue to the receptacle blank;

Fig. 17 is a fragmentary sectional view on the line 17—17 of Fig. 15 of the rolls for snapping off the blanks and feeding same into the receiving end of the forming mechanism;

Figs. 18 and 19 are similar perspective views of the bottom half of the folding compartment or section and show the blanks in different stages of the forming operation;

Fig. 20 is a transverse sectional view on the line 20—20 of Fig. 4 showing the collecting and drying chute;

Fig. 21 is an enlarged perspective view of the claw end of one of the members for removing the folded blank from the forming block;

Figs. 22 and 23 are views of the bottom and top sides respectively of a section of the paper strip just before it is separated into individual blanks, the side shown in Fig. 22 being at the inside of the finished dish and the side shown in Fig. 23 at the outside thereof;

Fig. 24 is a perspective view of the finished dish as made by the machine of the preceding figures;

Fig. 25 is a side view of a modified forming and collecting mechanism that may be employed with the machine of the preceding figures;

Fig. 26 is a longitudinal sectional view of said modified forming and collecting mechanism taken on the line 26—26 of Fig. 27;

Fig. 27 is a sectional view on the line 27—27 of Fig. 26;

Fig. 28 is an enlarged sectional view on the line 28—28 of Figs. 26 and 27;

Fig. 29 is a diagrammatic view illustrating the course of the paper strip through the machine up to the place where the folding operations occur either through the instrumentalities shown in Figs. 18 and 19 or those of the modification of Figs. 25, 26, 27 and 28; and Fig. 30 is a perspective view of a dish produced by the modified forming mechanism.

The apparatus disclosed herein is designed to make butter dishes, such as shown in Figs. 24 and 30, which are of a substantially rectangular form with inclined side and end walls, each dish having a rectangular bottom 35 with integral end wall portions 36 bent upwardly along the lines 37 and secured along their lateral edges to end extensions 38 of the side wall portions 39 which are integral with the bottom 35 and bent upwardly along the lines 40, the end extensions 36 being bent inwardly along the lines 41 against the outer faces of the end wall portions 36 to which they are adhesively secured, these dishes of Figs. 24 and 30 being alike except that the former has score lines 42 which are provided merely to facilitate the folding of the blank by one of the described infolding mechanisms into the dish form. The inturned ends 38 of the side walls do not extend entirely onto the end wall portions 36 but have about half of their area exposed at the inside of the dish as clearly shown in Figs. 24 and 30.

In the manufacture of these dishes a plain strip of paper of suitable character for making the dishes and of a width equal to the total width of the bottom 35 and upturned sides 39 of the dish, is fed to a paraffining device at the front end of the machine, then to a cutting and scoring mechanism, then to a device for applying adhesive or glue to selected portions of the paper and then to the forming mechanism from which the dishes are discharged into a collector at the rear end of the machine, all of which said devices and mechanisms are preferably mounted on an elongated base such as indicated at 43 in the drawings.

At the front or receiving end of the machine a pair of similar standards or frames 44 and 45 are secured by bolts 46 or in other convenient manner on the base 43 and these frames support the rolls 47 and 48 which co-operate to apply a coating of paraffin to the under side of the paper strip, and which said rolls also serve as a feeding device to unwind said paper strip which is indicated at 49, from a supply roll (not shown) as it is required in the operation of the machine.

The roll 48 over which the paper is passed and by which the paraffin is applied to the underside of the paper, is hollow, as shown in Fig. 6, and has a solid shaft 50 secured thereto and extended outwardly at one end through the extended bearing 51 of the frame 44 and this shaft is provided at its outer end with the sprocket 52 through which power is applied to rotate the roll. A tubular shaft 53 is secured to the other end of the roll 48 and communicates with the interior of the roll and this tubular shaft extends outwardly through a bearing in the standard 45.

Another hollow roll 54 similar to and preferably of the same diameter as the roll 48 but longer, as shown in Fig. 2, is mounted at a somewhat lower elevation than the roll 48 in bearing blocks 55 which are connected at their outer ends by a cross bar 56 and are horizontally slidable in the standards or frames 44 and 45 so that the peripheral surface of the roll 54 contacts or substantially contacts with the peripheral surface of the roll 48 and this roll 54 dips into a pan 57 which is mounted on the base 43 and serves to transfer paraffin from said pan to the peripheral surface of the roll 48, the amount of paraffin so transferred depending largely by the proximity of the roll 54 to the roll 48 which is regulated by adjusting the sliding blocks 55 in the standards 44 and 45.

A socket 58 is formed in each standard 44 and 45 at the inner end of the respective block 55 and contains a spring 59 which bears against and tends to force the respective block 55 outwardly in the slideway of its frame 44 or 45, and the outer end of each slideway is bridged by an arched strap 60 which has a threaded opening for an adjusting screw 61 which bears against the respective end of the cross bar 56 in front of the corresponding bearing block 55 so that said bearing blocks may be adjusted to regulate the proximity of the peripheral surface of the roll 54 to the peripheral surface of the roll 48.

A wiper 62 of felt or similar material is mounted on the cross bar 56 with screws 63 which permit adjustment thereof to and from the peripheral surface of the roll 54 to remove excess paraffin from the surface of the said roll before it supplies paraffin to the roll 48.

The pan 57 which contains the supply of paraffin for coating the paper is preferably removable, particularly for the purpose of avoiding solidification of the paraffin with the roll 54 embedded therein and to permit preliminary heating of the paraffin in starting the machine, and a recess 64 is accordingly provided in the base so that the roll 54 and pan may be dropped down to clear the roll 54 and be withdrawn endwise from under this roll, the pan being normally supported by protuberances 65 at the inner end of the recess 64 and a cross piece 66 which is removably engaged under the outer end of the pan 57 and straddles the recess 64.

The roll 54 is provided at one end with a solid shaft 67 engaged in the sliding bearing block 55 of the frame member 44 and this shaft has fixed thereon the gear 68 which meshes with the gear 69 which is fixed on the shaft 50 of the roll 48, the ratio of these gears being such that the rolls 48 and 54 are rotated at the same peripheral or surface speed. A tubular shaft 70, similar to the shaft 53 of the roll 48, is secured to the other end of the roll 54 and communicates with the interior of said roll, and this tubular shaft 70 extends outwardly through the bearing in the sliding block 55 of the frame member 45.

The rolls 48 and 54 are heated in order to properly handle the paraffin, the heating of the roll 54 also serving to maintain the paraffin in the pan 57 in liquid condition and the heating of the roll 48 also serving to condition the paper in contact therewith to absorb the paraffin, the heating of these rolls being preferably accomplished by circulating steam through the compartments within the rolls.

For introducing the steam into the rolls, each of the tubular shafts 53 and 70, as shown in Fig. 6 which is typical of the steam connections for each roll, has its bore enlarged at the outer end to provide a packing chamber with a shoulder 71 at the inner end forming a seat for the annular flange 72 of a tube 73 which projects outwardly beyond the end of the respective tubular shaft 53 or 70. A shell 74, recessed to receive the flange 72, is applied on the outer side of said flange, and a packing gland 75 is threaded into the end of the tubular shaft 53 to compress packing material 76 within the packing chamber and against the shell 74. Beyond the outer end of the packing gland 75 the tube 73 extends through and is locked by the set screw 77 in an opening of a bracket 78 that is fastened to the frame member 45 so as to hold said tube 73 against turning, the tubular shaft 53 or 70 being permitted to rotate around the respective tube 73 and at the same time a sealed joint being maintained by the packing 76.

The outer end of the tube 73 is threaded to engage in one end of a T-shaped pipe fitting 79 in the other end of which is fitted a nipple 80 which connects with a tube 81 that extends inwardly through the tube 73 and is bent downwardly at the inner end so as to terminate near to the bottom of the chamber in the respective roll 48 or 54. The side branch of the T-shaped fitting 79 has a pipe 82 connected therewith for supplying steam to the interior of the roll 48 or 54 through the annular space between the tubes 73 and 81 while the outlet for steam from the interior of the respective roll is through the small tube 81, the arrangement of the end of said tube at the bottom of the chamber in the roll serving to insure evacuation of any condensation which will of course accumulate at the bottom of the chamber and be forced outwardly through the tube 81 by the pressure of steam entering the chamber of the roll.

In practice I prefer to connect the rolls 48 and 54 in series, in which case the lead from the source of steam supply may be connected with the side branch of the T-shaped pipe fitting 79 of the roll 48 while a connection is provided from the nipple 80 of this fitting to the side branch of the T-shaped pipe fitting 79 of the other roll 54 so that the steam first enters the upper roll 48 and from there passes through the lower roll 54, it being obvious of course that the above mentioned connection between the outlet from the roll 48 and the inlet to the roll 54 must be of a sufficiently flexible nature to permit such adjustment as may be desired of the lower roll 54 to and from the upper roll 48.

The roll 47, which is located directly above and serves to hold the paper down against the paraffin applying roll 48, is secured on the shaft 83, the ends of which are journaled to rotate freely in bearing blocks 84 which slide vertically in slideways of the respective frames 44 and 45, each of said frames being provided directly under the respective bearing block 84 with a socket 85 for a spring 86 the upper end of which bears against the bearing block 84 thereabove. A strap 87 extends across the top of each bearing block slideway and has a threaded opening for an adjusting screw 88 which serves in conjunction with the spring 86 to permit adjustment of the pressure roll 84.

The paper 49 from which the dishes are formed, runs through the machine as a continuous strip to a point immediately preceding the folding mechanism where it is separated into individual blanks, said strip being, subsequently to its passage between the paraffin rolls, suitably scored and cut in the manner shown in Figs. 22 and 23 to almost completely separate the successive portions of the strip into individual blank portions 89 each of which after complete separation is formed into a dish of the character shown in Fig. 24.

In the formation of the strip 49 into the portions 89 which subsequently constitute the individual blanks, the strip is correspondingly notched in each edge as indicated at 90 in Figs. 22 and 23 at intervals corresponding to the required length of a dish blank, and between the corresponding opposed notches 90 the strip is almost entirely severed by a slit 91, a mere small connecting portion 92 of stock being left at each end of the slit 91 to maintain the adjoining blank portions 89 connected in strip form until they reach the dish forming mechanism.

Each of the partially severed blank portions 89 is scored at 37a and 40a to outline the portion 35a which subsequently constitutes the bottom 35 of the dish and the strip is slitted longitudinally at the inner end of each notch 90, these slits being substantially in line with and extending between the corresponding score lines 40a of adjoining dish blank portions 89 and comprising two parts 93 extending respectively into the end portions of adjoining blanks 89 to form the end wall portions 36. The portions of the blanks 89 at the outer sides of the score lines 40a and slits 93 are angularly scored at 41a to form the portions 39a and 38a the former of which subsequently constitute the side walls 39 of the butter dish and the latter of which are subsequently bent along the score lines 41a, which correspond to the edges 41 of the butter dish, and form the inturned extensions 38 of the side walls of the butter dish.

These end extensions 38, as hereinbefore pointed out, do not extend in their entirety over onto the end wall portions 36, but have a part thereof indicated at 94 in Figs. 22 and 23, which is exposed at the interior of the finished butter dish as clearly shown in Figs. 24 and 30, and a part 95 that extends over and is glued to the end wall portion 36, a score line 42a being provided between these parts 94 and 95 in the blanks from which the dishes of Fig. 24 are made but omitted from the blanks from which the dishes of Fig. 30 are made.

Obviously it is undesirable to paraffin the portions 95 of the paper that are glued to the end wall portions 36 and the roll 48, which in the illustrated machine is of a suitable diameter to paraffin four butter dish lengths in each revolution, accordingly has its peripheral surface correspondingly notched out adjacent each end of the roll and at suitable peripheral intervals as shown at 97 in Fig. 7 so that it will not apply paraffin to the portions 95 of the paper nor to the portions that are cut out to form the notches 90, the unparaffined portions being indicated by the unshaded areas in Fig. 22 which shows the paraffined side of the paper strip that constitutes the inner surface of the dish.

The paper strip 49 that is to be employed to make the butter dishes is supplied from a roll (not shown) which is rotatably mounted in any suitable manner to permit convenient replacement, and the paper is fed from the supply roll between a pair of idler rollers 98 and 99, the former of which is loosely mounted on the shaft 100 between flanged collars 101 which are fixed on the shaft 100 and serve as guides to insure feeding of the paper strip properly onto the paraffining roll 48.

The shaft 100 is journaled at its ends in bearing extensions 102 of the respective frames 44 and 45, being held against axial movement by collars 103 that are fixed on the shaft 100, and said shaft has secured thereon in properly spaced relation a pair of correspondingly extending arms 104 which have at their outer ends bearing openings for the shaft 105 upon which the roller 99 is mounted.

The shaft 100 projects outwardly beyond the frame 44 and has secured on the projecting end, a hand lever 106 which has a web extension 107 with an arcuate slot 108 engaged by a stem 109 which is threaded into the frame 44 and provided with a handle 110 for clamping the web portion 107 against the side of the frame 44. This arrangement permits swinging adjustment of the roll 99 about the axis of the shaft 100 to a suitable elevation with respect to the roll 98 so as to take the curl out of the paper strip 49 as it is fed into the machine, this curl being a normal characteristic of paper that has been wound in a roll.

In order to clean the surface of the paper before it reaches the paraffining rolls and to avoid the presence of any dust or other particles that might be objectionable in the production of the butter dishes from the paper strip, the latter, before it reaches the paraffining rolls, is passed between a pair of rotary brushes 111 and 112, carried by the shafts 113 and 114 respectively which are journaled at their ends in the frames 44 and 45 and provided with intermeshing gears 115 and 116 so that they rotate simultaneously in opposite directions. A sprocket 117 on the shaft 113 is connected by the chain 118 with a sprocket 119 on the tubular shaft 53 of the paraffin roll 48 so that the brushes 111 and 112 operate in a direction opposite to the direction of movement of the paper strip 49.

From the paraffining rolls the paper strip is drawn forwardly by and passes between the cutting and scoring rolls 120 and 121 which are mounted on side frames 122 and 123 which are secured to the base 43 as at 124. Each side frame 122 and 123 has a corresponding upwardly extending portion 125 with a shoulder 126 along the forward edge which is provided with a T-shaped slot 127 (see Fig. 2) forming a slideway for correspondingly shaped lugs of upper and lower bearing members 128 and 129 which serve respectively to support the cutting and scoring rolls 120 and 121, the upper bearing members 128 being suspended from the forked upper extremities 130 of the extensions 125 of the side frames 122 and 123 by threaded stems 131 which are secured to the respective bearing members 128 and project upwardly through and are clamped to the respective forks 130 by the upper and lower nuts 132 so as to permit adjustment of the bearing members 128 and the upper roll 120 that is carried thereby. Each lower bearing member 129 is also adjustably supported by a threaded stem 133 which is secured to and extends downwardly from the bearing member 129 into an opening or seat in the respective side frame 122 or 123 and is adjusted to and held at the proper elevation by a pair of nuts 133ª.

The shaft 134 which carries the upper roll 120 is journaled in the bearing members 128 and has a projecting end to which is secured a gear 135 which meshes with a similar gear 136 on the projecting end of the shaft 137 which carries the lower roll 121 and is journaled in the lower bearing members 129, the relation of the gears 135 and 136 being such that the rolls 120 and 121 operate at the same speed of rotation.

A main drive shaft 138 is journaled in the side frames 122 and 123 and provided at the end beyond the frame 122 with a loose pulley 139 which is connected with any suitable source of power, a clutch 140 of any suitable type being provided which is operable by the hand lever 141 to manually control the connection of the drive pulley 139 with the shaft 138. A small gear 142 which is fixed on the shaft 138 meshes with a large gear 143 which is rotatably mounted on a stub shaft 144, the latter being fixedly secured to the side frame 122, and this gear 143 which is retained on the stub shaft 144 by the collar 145, has secured thereto a small gear 146 which meshes with the gear 136 on the shaft 137 of the lower cutter roll 121. Said shaft 137 also has a sprocket 147 secured thereon which is connected by the chain 148 with the sprocket 52 on the shaft 50 of the paraffin applying roll 48, the driving relation being such that the peripheral rate of speed of the paraffin applying roll 48 is the same as the rate of speed at which the paper is drawn forwardly by the cutter rolls 120 and 121.

The lower roll 121 carries the cutting and scoring elements whereas the upper roll 120 merely provides a cylindrical surface with which the cutting and scoring elements of the roll 121 co-operate, said surface being plain except for the provision of recesses along the lines where the scoring takes place. These rolls, in the present machine are of the same effective diameter and provided with four sets of cutting and scoring facilities whereby four dish blanks are cut and scored in each revolution of the rolls 120 and 121.

Referring first to the roll 121, this comprises a body 149 of a generally cylindrical form with peripheral recesses forming abutments and cavities for attachment of the cutting and scoring elements, there being midway between the ends of said body 149 a central portion extending therearound and of a width substantially equal to the width of the bottom portion of the butter dish. This central portion is divided at circumferential intervals by narrow transverse grooves 150 into four uniformly spaced sections 35ᵇ and four intermediate sections each of which said latter sections is of two part formation, being divided by a relatively wide transverse groove or recess 152 into the portions 153 and 154 which constitute abutments or shoulders against which the cutting and scoring members are secured.

The sections 35ᵇ are of a length corresponding substantially to the length of the dish bottom 35 and at each end of each section 35ᵇ in the respective groove 150 is located a transverse scoring member 37ᵇ which is secured by cap screws 155 to the end face of the next adjoining intermediate section, the ends of the sections 35ᵇ being cut away as indicated at 156 to accommodate said set screws 155. Each of the so called intermediate sections as above pointed out is divided into and comprises two abutments or shoulders 153 and 154 which are separated by the groove or transverse recess 152 and it will be understood that the scoring members 37ᵇ at the opposite ends of each section 35ᵇ will be secured to the abutments or shoulders 153 and 154 respectively of the two next adjoining intermediate sections.

The body 149 is cut away at the sides of the sections 35ᵇ as indicated particularly at 157 in Fig. 10 and each of the sections 35ᵇ has secured to the side faces thereof the scoring members 40ᵇ which are curved longitudinally to correspond to the curvature of the cutter roll 121 and preferably overlap the ends of the scoring members 37ᵇ as shown in Fig. 10, said scoring members 40ᵇ being attached by cap screws 158 that engage into the sides of the section 35ᵇ.

The portions of the roll 121 that are between the sections 35ᵇ serve to cut and score the connected end portions of the adjoining blanks,— that is they cut the opposed notches 90 in the edges of the blank,—form the longitudinal slits 93 and the transverse slit 91 that almost entirely separates the adjoining blanks and impress the score lines 41ᵃ and 42ᵃ along which the blank is subsequently folded, the slits 93 being provided by cutters 93ᵇ which are secured to the opposite sides respectively of the intermediate section by cap screws 159 which are threaded into the portions 153 and 154 of the respective intermediate section. These cutters 93ᵇ are in line with and extend between the scoring members 40ᵇ of the adjoining sections 35ᵇ so as to form substantially a continuation of the said scoring members, and like said scoring members 40ᵇ are curved longitudinally so that their cutting edges correspond to the curvature of the cutter roll 121.

For providing the transverse slit 91 between the ends of adjoining carton blanks a cutter 91ᵇ is secured in the transverse groove or recess 152 so that it is located midway between the scoring members 37ᵇ. This cutter 91ᵇ is preferably slightly tapered in cross section as shown in Fig. 11 and clamped against the face of the larger abutment 154 at one side of the groove 152 by an elongated wedge block 160 which is drawn down into the groove 152 into wedging engagement with the cutter 91ᵇ by a pair of socket headed screws 161 which are threaded into the cutter body 149, a center screw 162 with a wrench socket in the outer end being preferably provided which is threaded through the wedge block 160 and bears against the bottom of the groove 152 to facilitate removal of the wedge block 160 and to serve as a precautionary means to avoid excessive wedging action. The heads of the screws 161 are countersunk in the wedge block 160 as shown in Fig. 12 so that they are safely below the cutting edges of the cutters and preferably are secured against accidental release by lock washers 163, and the screw 162 is of a suitable length so that the outer end is likewise safely below the cutting edges of the cutters.

The cutter 91ᵇ is located midway between the ends of and extends between the side cutters 93ᵇ but the cutting edge of said cutter 91ᵇ does not extend out to the cutting edges of the cutters 93ᵇ as it is desired to terminate the transverse slit 91 that is between the successive blanks 89 at a sufficient distance from the side slits 93 so as to leave unslitted portions 92 to maintain a connection between successive blanks. The spacing of the ends of the cutting edge of the cutter 91ᵇ from the respective side cutters 93ᵇ to leave these blank connecting portions 92 may be accomplished in any desired maner as for example the cutting edges of the cutters 93ᵇ may be arranged substantially in the planes of the outer faces of the cutters as shown in Fig. 12 so that there is approximately the thickness of the cutter 93ᵇ between the cutting edge of said cutter and the end of the cross cutter 91ᵇ or the ends of the cutting edge portion of the cutter 91ᵇ may be beveled as indicated in Fig. 10 if desired.

At each side of the so-called intermediate section 153—154 of the cutter 121, or in other words at the outer side of each cutter 93ᵇ are a group of cutters and scoring members for forming the notches 90 and scores 41ᵃ and 42ᵃ and as each group is the same a description of one group will suffice.

For accommodating these groups of cutters and scoring members, a recess 164 is provided at the opposite sides of each intermediate section 153—154 or at the outer side of each cutter 93ᵇ, each recess 164 being between a pair of peripherally spaced flanges 165 which have their opposed inner faces 166 substantially in line with the ends of the respective section 35ᵇ and have their inner ends spaced from said sections to accommodate the ends of the scoring members 40ᵇ therebetween.

Mounted in the recess 164 are a pair of blocks 167 located respectively next to the flanges 165 of the recess and each of which said blocks is secured in place by a pair of socket headed screws 168 which have their heads countersunk in the respective block 167 and are threaded into the body 149 of the cutter 121, said blocks 167 being recessed as at 169 in the side next to the cutter 93ᵇ to accommodate the heads of the screws 159 which secure said cutter 93ᵇ in place. Each of the blocks 167 is formed in the top face with a pair of grooves in which are fitted the scoring members 41ᵇ and 42ᵇ which form respectively the scores 41ᵃ and 42ᵃ of the blank, it being understood that the two blocks 167 in each recess 164 are alike except that one is what might be termed right hand and the other left hand as will be apparent from Fig. 10, and the scoring members 41ᵇ and 42ᵇ of the one block 167 form the score lines 41ᵃ and 42ᵃ respectively in the corner portion 38ᵃ of one blank and the scoring members 41ᵇ and 42ᵇ of the other block 167 form corresponding score lines 41ᵃ and 42ᵃ in the proximate corner portion 38ᵃ of the adjoining connected blank all of which will be readily understood by reference to Figs. 22 and 23.

The opposed faces 170 of the two V-blocks 167 in each recess 164 diverge outwardly from the respective cutter 93ᵇ in a substantially V-form corresponding to the notch 90 that is to be formed between the blanks and each block 167 has an angular cutter 90ᵇ secured against the respective face 170 by cap screws 171 that are threaded into the respective block 167, and these two cutters 90ᵇ conjointly form a notch 90 in the edge portion of the paper strip 49 in line with the slit 91 and between the successive blanks 89, there being two pairs of cutters 90ᵇ located respectively at the opposite ends of the cutter 91ᵇ as shown in Fig. 10 so that a pair of notches 90 are simultaneously cut in the opposite edge portions of the paper strip 49.

A wedge block 172 is located between the divergent cutters 90ᵇ in each recess 164, being secured in place by a socket headed screw 173 which is threaded into the body 149 of the cutter roll with the head countersunk into the wedge block, the lateral edge faces of this wedge block being recessed as at 174 and the end cut away as at 175 to accommodate the heads of the screws 171 which serve to attach the cutters 90ᵇ to the blocks 167. A clamp block 176 extends between the flanges 166 at the outer end of each recess 164 and is secured to the body 149 of the cutter roll by a pair of socket headed screws 177 which have their heads countersunk in said block 176, and this clamp block has a pair of screws 178 threaded therethrough and engaging at spaced points against the large end of the wedge block 172 so as to force the latter inwardly between the divergent cutters 90ᵇ, said wedge block 172 being preferably split at the larger end as indicated at 179 so that it has sufficient spring to conform to the angularity of the outer divergent portions of the cutters 90ᵇ.

The upper roll 120 which serves to hold the paper strip 49 down in cutting and scoring engagement with the lower roll 121, preferably has removable inserts 180 at the locations where the cutters of the roll 121 co-operate therewith, four of these inserts being provided in the present case, arranged at uniformly spaced intervals around the periphery of the roll, the latter being formed with recesses 181 in which the respective inserts 180 are secured by the screws 182 which have socket heads countersunk in the insert.

The surfaces of the inserts 180 where the cutters 90ᵇ, 91ᵇ and 93ᵇ co-operate therewith are plain, said cutters being arranged so that their edges work sufficiently close to the surfaces of the inserts so as to satisfactorily cut through the paper strip 49. For scoring the paper, however, the roll 120 is provided with grooves to co-operate with the scoring members of the roll 121 said grooves being indicated at 37ᶜ, 40ᶜ, 41ᶜ and 42ᶜ and co-operating respectively with the scoring members 37ᵇ, 40ᵇ, 41ᵇ and 42ᵇ of the roll 121, the grooves 37ᶜ, 41ᶜ and 42ᶜ and the end portions of the grooves 40ᶜ being formed in the inserts 180 and the grooves 40ᶜ except their end portions, being formed in the body portion of the roll 120.

The rolls 120 and 121 which are secured respectively to the shafts 134 and 137 have reduced tubular extensions or hub portions 183 at their ends with disk members threaded thereon for axial adjustment, the disk members of the roll 120 being indicated at 184 and those of the roll 121 at 185, and each disk member has a laterally extending split hub 186 provided with a clamping bolt 187 whereby the disk is secured in any desired position of adjustment on its respective tubular extension 183. These disks 184 and 185, which cooperate to serve both as spacers and aligners for the cutter rolls 120 and 121, have their engaging peripheral edges beveled as shown in Fig. 8, the edges of the disks 185 being inclined inwardly and toward the axis of the shaft 137, to form in effect a two part V shaped seat for the disks 184, the edges of which are inclined outwardly and toward the axis of the shaft 134.

By reason of these interengaging beveled edges of the disks 184 and 185, adjustment of the disks along their respective tubular extensions regulates the proximity of the rolls 120 and 121 to one another and a very fine adjustment is permitted because of the threaded arrangement of the disks on the extensions 183. Moreover because of the oppositely beveled arrangement of the edges of the disks 185, the engagement of the beveled edges of the other disks 184 therewith effects a relative centering action upon the rolls and by proper axial adjustment of the disks an accurate relative axial adjustment of the rolls 120 and 121 may be effected to insure proper operative relation of the scoring members of the roll 121 with the corresponding grooves of the roll 120. To insure feeding of the paper strip 49 accurately to the rolls 120 and 121 an idler roll 188 of a spool like form and with flanges 189 spaced apart to confine the strip 49 therebetween is provided over which the strip 49 passes just before it is fed between the rolls 120—121, this roll 188 being formed at the opposite ends with shaft like extensions 190 that are journaled in bearings of the respective extensions 125 of the frames 122 and 123.

As the paper strip 49 is passed between the rolls 120 and 121 the cutters 90ᵇ cut out substantially V-shaped portions 90ᵃ from the edges of the paper at intervals to form the notches 90 between the successive blanks and it is desirable to positively remove these portions 90ᵃ as they are cut from the strip. For this purpose the roll 120 is provided with pins 191 projecting from the surface in proper positions so that one of these pins engages between each pair of divergent cutters 90ᵇ as the latter are cutting out the V-shaped portion 90ᵃ from the edge of the strip 49, the socket of the socket headed screw 173 of each block 172 of the cutter roll 121 being located to admit the pointed end of the respective pin 191 therein at this time; and by reason of this arrangement each of the cut out portions 90ᵃ, as it is cut out, is impaled upon a pin 191 and in the further rotation of the roll 120 is removed from the strip 49 and carried upwardly to the top where it is removed.

For removing these paper pieces 90ᵃ from the pins 191, a chute 192 is provided and has its inlet end located near the top and at the down coming side of the roll 120 as shown in Fig. 9, said chute being in the present construction divided directly below its inlet end into two divergent branches 193 which lead downwardly and outwardly through openings 194 in the respective side frames 122 and 123, and this chute 192 has secured to the upper end of its bottom or forward wall, a stripper plate 195 with a pair of spaced notches 196 in line respectively with the two peripheral series of pins 191 of the roll 120. This plate 195 is tapered upwardly and forwardly to a thin edge which is located close to the peripheral surface of the roll 120, as shown in Fig. 9, the notches 196 forming forked plate portions which straddle the pins 191 and as the roll 120 rotates, engage at opposite sides of the pins and between the peripheral surface of the roll 120 and the paper pieces 90ᵃ on the pins as the latter are moving downwardly at the down coming side of the roll 120 and thereby strip the paper pieces 90ᵃ from the pins 191 and discharges them downwardly through the chute 192 and branches 193 thereof and through the discharge openings 194 where these paper pieces may be collected in a receptacle or otherwise disposed of.

From the cutter rolls 120 and 121 the paper strip 49 which has now been scored and cut into successive slightly connective butter dish blanks, as shown in Figs. 22 and 23, is passed to the gluing mechanism which applies a coating of glue on the under side of the strip 49 to small areas at opposite sides of the slit 91 as indicated by the stippled areas 197 in Fig. 23, which said areas are subsequently overlapped by the unparaffined portions 95 of the blank when the latter is folded or shaped in the butter dish form. This gluing mechanism is mounted on corresponding elevated or upwardly extending portions 198 of the side frames 122 and 123, said portions 198 being preferably separate from the frames 122 and 123 and in the form of brackets that are bolted thereon, and said gluing mechanism comprises pick up and transfer rolls which are supplied with glue from a pan or receptacle 199 and apply it at the locations 197 on the paper strip 49.

A pair of gluing rolls 200 and 201 are secured on their respective shafts 202 and 203 in line with the strip 49 as it issues from the cutter rolls 120 and 121, said strip being guided in its passage from the cutting rolls to the gluing rolls by a plate 204 which extends between the cutting rolls and the gluing rolls and has flange members 205 secured thereto along the edges and extending inwardly thereover so as to overlie and loosely confine the edge portions of the strip 49, the said plate 204 being supported on a cross bar 206 which is secured at its ends to lugs 207 of the side frame portions 198.

For removing any scrap particles or fibres of paper that may result from and be carried along with the paper strip after the cutting operation a nozzle 208 is mounted above the guide plate 204 so that it is close to and extends across the top of the paper strip 49 on said guide plate, the side flanges 205 being cut away where required to admit the nozzle, and the latter is connected by a hose 209 with a suitable source of suction (not shown). The nozzle may, of course, be provided or formed with wires or ribs extending across the opening in the direction of movement of the paper strip 49 and serving as guards to prevent any portions of the paper strip being sucked up and catching in the nozzle, said guards, however, not being shown as their construction and arrangement will be readily understood.

The roll 201 which is merely an idler with a plain peripheral surface serving to support the paper strip while the glue is applied to the opposite side by the roll 200, is of a length substantially the same as that of the roll 200 and projects at its top through an opening 210 in the guide plate 204 which latter is continued and curved downwardly beyond the gluing rolls, as shown at 211 in Fig. 15, the width of said opening 210 being such as to leave marginal portions of the plate 204 at each end of the roll 201 under the flanges 205 which are likewise continued at the ends of and beyond the rolls 200 and 201 and overlie the edges of the curved portion of the plate 204 as indicated at 212 so that the edge portions of the strip 49 are confined and guided the entire distance from the cutting rolls 120 and 121, past the gluing rolls 200 and 201 to the lower end of the curved guide 211—212.

The upper glue applying roll 200 has a peripheral rib 213 bearing against the center of the strip of paper 49 on the roll 201 and co-operating with the latter to positively advance the paper strip along the guides 204—205 and at suitable intervals around the roll 200 are pairs of glue applying lugs 214, the lugs of each pair being spaced a slight distance from and arranged at opposite sides respectively of the rib 213 and having peripheral surfaces 215 that correspond to the combined area of the two surfaces 197 (see Fig. 23) of adjoining blanks that are along the same slit 93—93 and at opposite sides of the slit 91 and upon which glue is to be applied, said surfaces 215 being substantially at the same radial elevation on the roll 200 as the peripheral surface of the rib 213 so as to contact with the surface of the paper strip 49 as it passes between the rolls 200 and 201 and said surfaces 215 being preferably scored or otherwise roughened to insure a satisfactory application of glue. In the present construction the roll 200 is of such diameter that in each revolution thereof a length of strip 49 equal to the combined length of two butter dish blanks is passed between the rolls and two sets or pairs of glue applying lugs 214 are accordingly provided, the roll 200 being of course properly timed with respect to the cutter rolls 120 and 121 to apply the glue accurately on the areas 197 of the paper blanks. A bar 216 extends between the frame extensions 198 and has a scraper edge adjacent the uprising side of the roll 200, said bar being secured at its ends to lugs 217 of said frame extensions by bolts or cap screws passing through slotted openings of said lugs 217 so that the scraper edge of the bar 216 may be adjusted sufficiently close to the path of the lugs 214 to scrape off any glue or other material that may accumulate on the glue applying surfaces 215.

The shaft 202 of the roll 200 is journaled in fixed bearings of the side frame extensions 198 and has a gear 218 secured on one end outside the respective frame extension 198 and meshing with an idler gear 219 which is carried by a stub shaft 220 which is secured to and extends laterally from said extension 198, and said idler 219 meshes with the gear 135 of the upper cutter roll 120 to drive the glue applying roll 200. The other roll 201 has the ends of its shaft 203 journaled in bearing blocks 221 which are mounted in slide ways 222 of the respective frame extensions 198, the outer end of each slide way being closed by a strap 223 secured to the respective extension 198 and provided with a screw 224 for adjusting the block 221 in the slide way 222 against the tension of a spring 225 which is seated in a socket of the frame extension 198 at the inner end of the slideway 222.

A shaft 226 has a plain surfaced roll 227 secured thereon which is located so as to dip into the glue contained in the pan or receptacle 199 and from this roll 227 glue is transferred to a roll 228 which is fixed on a shaft 229 and this latter roll 228 applies a coating of glue to the surfaces 125 of the lugs 214 of the glue applying roll 200.

The roll 228 is shorter than the roll 227 so as to be remote from the edge portions of the roll 227 which might pick up or accumulate an excess of glue, and has a central peripheral groove 230 in line with and somewhat wider than the rib 213 of the roll 200 and forming a pair of spaced peripheral surfaces 231 which receive glue from the roll 227 and apply it to the lugs 214 of the roll 200.

The roll 228 is adjustable to and from the roll 200 to work in proper coating relation to the surfaces 215 of the lugs 214 and to this end the ends of the shaft 229 are journaled in bearing blocks 232 which are mounted respectively in slideways 233 of the side frame extensions 198. A strap 234 which is secured to the respective frame extension 198 closes the upper end of the respective slideway 233 and is provided with a screw 235 for adjusting the bearing block 232 in the slideway 233 against the tension of a spring 236 which is seated in a socket of the frame extension 198 at the inner end of the slideway 233.

The roll 227 is also adjustable to and from the roll 228 and accordingly has the ends of its shaft 226 journaled in bearing blocks 237 which are mounted in slideways 238 of the respective frame extensions 198, and these slideways 238, which are inclined as shown in Fig. 3, downwardly and somewhat laterally toward the side at which the roll 228 is located, are closed at their upper ends by straps 239, secured to the respective frame extension 198, and each strap has a screw 240 for adjusting the respective bearing block 237 in its slideway 238 against the tension of a spring 241 which is seated in a socket of the frame extension 198 at the inner end of the slideway 238.

The roll 228 is driven from and at the same peripheral speed as the roll 200 by a gear 242 on the shaft 202 of said roll 200 which said gear 242 meshes with a gear 243 on the shaft 229 of the roll 228 and on the shaft 229 is another gear 244 meshing with a gear 245 on the shaft 226 of the roll 227 for operating the latter, the ratio of the gears 244 and 245 being such that the roll 227 is rotated at a higher peripheral speed than the roll 228 so as to have a sort of tendency to pile up the glue coating on the surfaces 231 of the roll 228.

The rolls 209, 228 and 227 operate in the directions indicated by the arrows in Fig. 15 and at the uprising side of the roll 227, a cross bar 246 extends between and has its ends secured to the side frame extensions 198, these extensions in the illustrated structure having corresponding openings through which cap screws 247 are engaged into the ends of the cross bar 226. A wiper 248 is mounted on this cross bar 246, said wiper being contained in a U shaped frame 249 the side arms of which are extended inwardly along the end faces of the roll 227 as shown in Fig. 4 and in sufficiently close proximity thereto to prevent accumulation of glue on the end faces of the roll. The wiper frame 249 is mounted on the cross bar 246 with adjusting screws 250 which permit adjustment of the wiper 248 to regulate the coating of glue that is carried up on the surface of the roll 227 to the transfer roll 228.

After the carton strip 49 has the glue applied to the areas 197 it is fed downwardly and forwardly through the curved guide 211—212 to a pair of feed wheels 251 and 252 which separate the strip 49 along the slits 91 into successive blanks which are delivered by said rolls in regular successive order to a former which shapes the separated blanks 89 into the butter dish form. Two types of forming mechanisms are disclosed herein, one of these which is shown in Figs. 25, 26, 27 and 28 being of plunger type which forms the butter dish of Fig. 30 and the other of which employs a series of chain carried former blocks which travel successively through the former housing from end to end and form the butter dishes of Fig. 24 which differ from the butter dishes of Fig. 30 only in the presence of score lines 42 which are provided merely to facilitate the forming operation as it is performed by the chain type of forming mechanism. Either of these forming mechanisms may be employed with the machine described herein as the strip 49 is prepared in the same manner and with the same operations, which are represented diagrammatically in Fig. 29, up to the entry of the separated banks into the forming mechanism, except that in the case of the plunger type of former the score lines 42ª are omitted and the scoring members 42ᵇ are accordingly omitted from the roll 121 and the grooves 42ᶜ may be omitted from the roll 120.

Referring first to Figs. 3, 4, 15, 18 and 19 which show the chain type of forming mechanism which is represented herein in assembled relation with the strip preparing machine, the reference numerals 253 and 254 indicate the top and bottom halves respectively of a horizontally arranged former housing which is open at both ends and has the receiving end located under the rolls 251—252 so that these rolls deposit the blanks into the receiving end of said former housing, one of said blanks being shown in the deposited position at 89 in Fig. 15. The parts 253 and 254 of the former housing are separated so as to provide a corresponding slit 255 at each side of and extending from end to end of the housing 253—254 between corresponding upper and lower portions 256 of the housing side walls, and these slits 255 provide channels for cross bars 257 which are secured at their ends to and connect a pair of side conveyor chains 258 which are trained around sprockets 259 and 260, and each of these cross bars has a folder block 261 thereon to engage the blanks 89 and push them through the former housing 253—254 at the delivery end of which they are accumulated in a horizontal stack, the sprockets 259 and 260 being mounted at a suitable elevation so that the upper lengths of the chains 258 support the cross bars 257 so that they pass freely through the slits 255.

The top wall 262 of the former housing 253—254 is spaced from the bottom wall 263 a distance substantially the same as the length of the blank 89, the top wall 262 being cut away at 264 to accommodate the bottom of the roll 251 and somewhat shorter than the bottom wall 263 so as to afford unobstructed entry of the blank into the former housing 253—254 at a point over the end of the bottom wall 263, which said end thus serves as a stop and support for locating and holding the blank 89 in the pre-forming position. The opposite side walls 256 of the former housing are spaced apart a distance only slightly greater than the width of the blank 89 so as to admit the latter freely therebetween and at the same time confine the blank transversely so that it is accurately positioned for engagement by the former block 261, and these side walls 256 have on their inner faces the upper and lower cleats 265 which are located at one side of the path of entry of the blank 89 into the former housing and serve to guide the blank as it enters and prevent displacement thereof from the upright position in the housing, said cleats having their upper ends curved as shown in Fig. 15 to form guiding faces which will insure free passage of the blank edges down the rear faces of the cleats.

Each of the halves 253 and 254 of the folder housing is provided with folding facilities, which as the blank is pushed by a folder block 261 from the position shown at 89 in Fig. 15 through the housing to the discharge end thereof, folds the sides and ends of the blank 89 to shape the latter into the butter dish form, the said folding facilities in the upper half 253 being a duplicate of those in the lower half 254. Each wall 262 and 263 accordingly has a centrally disposed folding member 266 thereon extending along the respective wall 262 or 263 from the blank location under the feed rolls 251—252 to a point near the rear or discharge end of the housing 253—254, said folding member 266 being of a thin fin-like form as shown at 267 throughout the greater portion of its length with a wider head portion 268 at its forward end to which one end of the fin portion is anchored, there being at the rear end of each fin like portion 267 a curved surfaced block 269 which is secured to the respective wall 262 or 263 and serves as an anchorage for the rear end of the respective fin member 267. The folding members 266 are spaced apart a suitable distance to accommodate therebetween the folder blocks 261 which pass along in upright position between said folder members 266 and each of said folder blocks has a forward or leading face (which may be recessed as shown at 379 if desired) of a rectangular form and of a size corresponding to the bottom wall 35 of the butter dish and adapted, when a blank 89 is in position at the receiving end of the former, to engage the area 35ª thereof.

As the blank 89 is pushed rearwardly from the entry location in which it is shown in Fig. 15, the extensions 36ª at the upper and lower ends of the blank 89 engage the heads 268 of the folding members 266, which are located suitably adjacent to the blank entry location to co-operate with the cleats 265 in directing the blank to and holding it upright in the pre-forming position shown at 89 in Fig. 15, and these heads 268 which are of a width to afford an adequate contact face and rounded at 270 to facilitate the folding operation, fold the end wall portions 36$^a$ of the blank 89 inwardly along the score lines 37$^a$ against the top and bottom faces 380 of the former block 261, in which position said portions 36$^a$ are thereafter held by the fin members 267 until the blank passes beyond the folding zone of the folder housing 253—254.

For folding the sides 39$^a$ of the carton blank 89 against the side faces 271 of the former blocks 261 a pair of folder strips 272 are mounted at the inner side of each of the side walls 256 with the strips of each pair located respectively above and below the slot 255, each of said strips 272 being attached to its respective side wall portion 256 by a pair of stems 273 which extend through corresponding apertures in the respective side wall portion, springs 274 being mounted on said stems between the strip and side wall and nuts 275 threaded on the outer ends of the stems 273 so that the strips are adjustable and yieldingly held in their normal positions.

The forward ends of the strips 272 which are set back from the forward ends of the head portions 268 of the folding members 266 sufficiently so that the end portions 36$^a$ of the blank are folded down against the upper and lower ends of the former block 261 before the sides 39$^a$ of the blank are folded against the side faces 271 of the former block, are curved as shown at 276 in Figs. 18 and 19 to facilitate the folding of the sides 39$^a$ of the blank against the side faces 271 of the former block 261, said side faces 271 being arranged, as shown in Figs. 18 and 19, in a less divergent relation than the side walls 39 of the finished butter dish so that in the forming operation the corner portions 38$^a$ of the blank may be bent back along the lines 41$^a$ toward the respective end faces 380 of the former block 261 and also bent in the middle along the score lines 42$^a$ to lay the unparaffined portions 95 flat against and in proper position upon the glued areas 197 of the respective folded down end portions 36$^a$ of the blank.

It is for the purpose of insuring proper folding of the corner portions 38$^a$ at this time that the score lines 42$^a$ are provided, the former block 261 being provided at each end with a pair of ears 277 over which these corner portions 38$^a$ of the blank are folded inwardly along the lines 41$^a$ and at the inner sides of which said ears 277 the said portions 38$^a$ are bent along the lines 42$^a$ by pairs of curved rail like folders 278 on the inner sides of the top and bottom walls 262 and 263 of the folder 253—254. The ears 277 may of course be provided in any convenient manner as for example by forming recesses in the side faces 271 of the block 261 and securing therein the strips 279, the ends of which project beyond the ends of the block 261 and are suitably formed to accomplish the folding operation.

The forward ends of each pair of rail like folders 278 are flared outwardly as at 280 substantially to or beyond the inner faces of the corresponding side folder strips 272 and are located somewhat rearwardly of the curved forward ends of said folder strips 272 so that the sides 39$^a$ of the blank are folded inwardly against the side faces 271 of the folder block 261 before the corner portions 38$^a$ engage the rails 278, the forward ends of which then, by reason of their curved formation, turn said corner portions 38$^a$ inwardly along the score lines 41$^a$ and over the ends of the ears 277 of the former block 261 as the latter moves rearwardly along the curved ends 280 of the rails 278, and it will be noted that it is ahead of this location that the center folders 266 are reduced to a fin like thickness as at 267, this being done so that the folders 266 are sufficiently thin at and beyond the point where the portions 38$^a$ are turned in to insure ample clearance for the inner ends of said inturned portions.

The inner edge portions of these rails 278 are, beyond the curved portions 280, continued rearwardly with a bearing edge formation 281 which is arranged at a gradually increasing elevation from the respective wall 262 or 263 of the former 253—254, and these bearing edges 281 of the rails of each pair also diverge gradually toward the rear end of the former 253—254 as shown in Figs. 18 and 19 to a width slightly less than the distance between the pairs of ears 277 at the ends of the former block 261 so that the blank portions 38$^a$, after they have been folded inwardly by the curved ends 280 of the rails 278, are in the continued movement of the former block 261 along the rails 278, gradually slid along the edges 281 and thereby folded along the score lines 42$^a$ so that the portions 94 thereof lie along the inner sides of the respective ears 277 and the unparaffined portions 95 are applied flat against the glued areas 197 of the end wall portions 36$^a$ in the positions they are to occupy in the completed butter dish, it being understood that as the former block 261 moves along the curved portions 280 of the rails 278 and the blank portions 38$^a$ are folded inwardly, the ears 277 of the former block pass over the flat top faces of the curved portions 280 to the outer sides of the bearing edges 281 of the rails 278.

The rails 278 and side folders 272, which extend slightly beyond the center folders 266, terminate at a distance inwardly from the rear or discharge end of the folder 253—254 and the rails 278 are continued from this point outwardly a short distance beyond said end of the folder 253—254 by extensions 282 which are secured to the respective top or bottom walls 262 and 263 by stems 283 which are passed through apertures in the respective top or bottom walls and have adjusting nuts 284 threaded on their outer ends. Angle irons 285 may be attached to the inner sides of the walls 262 and 263 and provided with apertures through which the stems 283 pass and each stem 283 has a spring 286 thereon between the respective angle iron 285 and extension 282 to provide a cushion arrangement of the said extensions. These extensions 282 have laterally spaced V-edged ribs 287 and 288 to engage and hold the blank portions 95 against the glued surfaces 197 of the blank ends 36$^a$, this V-edge formation being employed to reduce the area of contact for two purposes,—namely to minimize the frictional drag on and prevent possibility of displacement of the blank portions 95, and to avoid a surface upon which extruded glue might accumulate, the V-edge 287 being arranged to engage substantially at the angle or bend between the blank portions 94 and 95 and the V-edge 288 being located to engage adjacent to the tip or inner end of the inwardly extending portion 95, the end of each extension 282 that is next to the respective rail 278 being beveled at the inner edge as at 289 to insure that said tips or inner ends of the portions 95 will ride readily onto the V-edge 288 of the respective extension 282.

Each half section 253 and 254 is independently mounted, the lower section 254 being secured on flat cross bars 290 the ends of which are secured respectively on lugs 291 at the inner sides of the side frames 122 and 123, while the upper section 253 is secured to a bottom flange 292 of a transverse bracket plate 293 which is secured at its ends to upright portions of the side frame extensions 198. This bracket plate 293 has a seat portion 294 at the top upon which the glue receptacle 199 is supported, the latter being provided at each side with an ear 295 at the bottom by means of which the glue receptacle is bolted to the bracket plate 293. A pipe 296 leads from the lower part of the glue receptacle to a convenient point for drainage and is capped at its lower end as shown.

The chains 258, which propel the forming blocks 261 through the former 253—254, are located respectively at the outer sides of said former the pairs of sprockets 259 and 260 being secured on their respective shafts 297 and 298 in suitably spaced relation for this purpose. The shaft 297 on which the sprockets 259 are mounted is journaled at its ends in bearings 299 of the respective side frames 122 and 123 and the shaft 298 of the other sprockets 260, which is located slightly beyond and at the bottom of the discharge end of the former 253—254, is journaled in bearings 300 and 301 of extensions 302 and 303 respectively of the side frames 122 and 123. This shaft 298 extends outwardly at the outer side of the frame 122 and has secured thereon a bevel gear 304 and a large spur gear 305. A shaft 306 is journaled in brackets 307 and 308 that are attached to the side frame 122 and has a bevel pinion 309 at one end meshing with the bevel gear 304 on the shaft 298. The other end of this shaft 306 is located adjacent to the idler gear 143 through which power is transmitted from the main drive shaft 138 of the machine to the cutter rolls, and this idler gear 143 is formed on its outer face with a bevel gear 310 which meshes with a bevel pinion 311 on the shaft 306 for communicating power through said shaft to the shaft 298 for operating the chains 258.

These chains 258 as previously explained are connected at suitable intervals by cross bars 257 and the former blocks 261 are attached so that they are ahead of the cross bars in order that the latter will not interfere with the folding of the blanks against the sides of the former blocks. Each block 261 is accordingly provided with a rearwardly extending transverse flange or lug 312 by means of which the former block is bolted or otherwise secured to the middle of its respective cross bar 257.

The feed wheels 251 and 252 which separate the strip 49 into successive blanks 89 and introduce said blanks into the receiving end of the former 253—254, are located at the lower end of the curved strip guide 211—212 at a suitable distance from the gluing rolls 200 and 201 so that as the leading edge portion of the first blank 89ª of the strip 49 is engaged between the wheels 251—252 the rear edge of said blank has passed beyond the gluing rolls 200—201 while the next succeeding blank of the strip 49 is at that time engaged between said gluing rolls. The wheels 251 and 252 are rotated in the directions indicated by the arrows and at a peripheral rate of speed sufficiently higher than that imparted to the paper strip 49 by the gluing rolls 200—201 so that as the leading edge of the strip 49 reaches the feed wheels 251—252, the end blank 89ª of said strip is snapped off or disconnected at the points 92 from the next succeeding blank which is at the time held by the slower moving rolls 200—201, and said disconnected blank is discharged downwardly by the feed wheels 251—252 into the pre-folding position shown at 89 in Fig. 15 at the receiving end of the former 253—254, the rate of feed of the wheels 251—252 being sufficiently greater than the rate of travel of the strip 49 that an interval of time occurs between each deposit of a blank 89 into the former 253—254 during which interval a former block 261 engages and moves the deposited blank away before the next succeeding blank is deposited, it being understood of course that the operation of the chains 258 is timed with the feed of the strip 49 so that as soon as each successive blank 89 is deposited it is engaged and carried away through the former 253—254.

The wheel 251, which is secured on the shaft 313, is of disk like form with a relatively narrow peripheral face that engages the upper side of the paper midway between the lateral edges thereof while the wheel 252 which is secured on the shaft 314 comprises a body with a peripheral groove in which is secured a ring 315 of rubber or other suitable material that co-operates with the peripheral edge of the wheel 251 and insures a positive gripping of the paper between the feed wheels 251—252. The shaft 314 is journaled at its ends in bearings 316 of the respective side frames 122 and 123 while the ends of the shaft 313 project through openings in the respective side frames 122 and 123 and are journaled in bearings 317 that have flat extensions 318 secured by bolts or cap screws 319 to the outer side of the respective frame 122 or 123. The bolt holes 320 of each bearing bracket extension 318 are elongated, as shown in Fig. 3, in a direction to permit adjustment of the feed wheel 251 to and from the feed wheel 252, and beyond the outer end of each extension 318 the respective frame 122 or 123 has an outwardly extending lug 321 through which a screw 322 is threaded so as to engage against the outer end of the bracket extension 318 for facilitating adjustment of the bearings 317.

The shaft 314 on which the feed wheel 252 is secured has a gear 314ª fixed thereon and meshing with a similar gear 313ª on the shaft 313 so that the rolls 251 and 252 operate at uniform speed, the shaft 313 of the feed wheel 251 being driven from the shaft 226 of the glue pick up roll 227 by the large sprocket 323 which is fixed on the shaft 226 and connected by the chain 324 with a smaller sprocket 325 on the shaft 313.

It is, of course, necessary to remove the folded blanks from the former blocks 261 as they emerge from the folder 253—254 and this is accomplished by a carton picker and collector mechanism that is mounted on the base 43 beyond the discharge end of the former 253—254. A pair of laterally spaced side frame members 326 are accordingly secured to the base 43 and provided with cross connecting plates 327 on each of which is mounted a pair of laterally spaced upwardly extending brackets 328 to which are attached a pair of laterally spaced corner angles 329 and laterally spaced upper and lower side strips 330 which constitute an elongated open top carton collector or receiver that is spaced a short distance from the delivery end of the former 253—254 and is substantially in line with the path of movement of the folded blanks as they emerge from the delivery end of said folder, the strips 330 at one side of said collector being spaced from the strips 330 at the other side a distance substantially equal to the intended width of the completed dish as measured between the top edges 331 of the side walls 39 (see Fig. 24), and the angles 329 being adapted to provide corner seats for the lower corners of the butter dishes and thereby support the accumulating dishes in the collector.

The dishes as formed on the former blocks 261 are not of fully expanded width, said dishes being shaped and held in a transversely contracted manner by the side folder strips 278 to allow for the folds at the ends which overlie the ears 277 of the former block, but said dishes, after they pass the rear ends of said strips 278 expand transversely to an extent to separate the free edges 331 of the side wall portions 39 of the carton from the side faces 271 of the former blocks 261 sufficiently so that these edges may be engaged by pickers to remove the folded blanks from the folder blocks 261. This lateral expansion may be gradually accomplished by adjusting the folder strips 272 at opposite sides of the housing 253—254 so that they diverge slightly toward their rear ends and thereby gradually release the lateral confinement of the folded blanks and may be further accomplished by forming the rails 278 so that there is a corresponding gradual relaxation of the ends of the folded blank, and moreover the rail extensions 282 which are substantially the sole means of holding the folded blanks on the former blocks 261 after the latter pass beyond the discharge end of the former 253—254, may be adjusted to permit any further transverse expansion of the folded blank that may be necessary.

As the former blocks 261 emerge from the discharge end of the folder 253—254 the folded blanks that are then substantially in dish form, are removed from the former blanks by side pickers that operate in timed relation with the folder block carrying chains 258. This picker mechanism comprises bars 332 located respectively at opposite sides of the butter dish collector, which said bars are mounted to slide longitudinally in the brackets 328 and are connected to operate in unison by a yoke shaped plate 333 which extends down under the collector as shown in Fig. 20 and has the upwardly extending end portions secured respectively to the bars 332. Each bar 332 has on its end nearest the former 253—254 a claw member 334 (see Fig. 21) with inwardly extending fingers 335, and these claw members are adapted to engage with the edges 331 of the folded dish on each former block 261 as the latter emerges from the former 253—254 and transfer said dish to the receiving end of the collector 329—330.

This picker mechanism necessarily operates rapidly in order to remove the dish from the former block 261 which is itself moving at a somewhat rapid rate of speed, and by its rapidity of movement the picker mechanism practically throws the folded dish from the former block into the end of the collector so that little if any assistance is required to prevent accidental displacement of the dish from its proposed path.

The pull of the picker claws 334 however on the edges 331 of the dish, tends to expand the dish which is free to and has a tendency to so expand after it is withdrawn from the rail extensions 282, and in order to limit the expansion and serve as lateral guides for the dishes in their transfer to the collector, the upper collector side strips 330 have extensions 336 reaching forwardly into the discharge end of the former 253—254, no such extensions being provided on the lower collector strips 330 as they not only are unnecessary but they would be located in the path of the former block supporting bars 257 as the latter pass downwardly around the sprockets 260.

These extensions 336 are secured at their outer ends to the inner sides of the collector side strips 330 so as to form shoulders 337, and as the strips 330 are spaced apart to snugly embrace the dish when expanded to its normal width, the extensions 336 are accordingly spaced apart a lesser distance and confine the carton sufficiently in its movement from the former 253—254 to the carton collector 329—330 so that as the pickers 334 reach the outer limit of their movement at which time they have moved the dish slightly beyond the shoulders 337, the side edges 331 of the dish spring outwardly and engage behind the shoulders 337 and prevent any accidental displacement of said dish as the pickers 334 return to pick off another dish.

Each newly formed dish is by the operation of the pickers 334 nested into the previously formed dish at the end of the stack in the collector 329—330 and as it is the progressive addition of dishes by the pickers 334 to the stack that slides the latter along the collector, it is obvious that each newly formed dish is fitted snugly into the previously formed dish.

The collector 329—330 is of a size to closely confine the dishes in their normal or proper expanded form and when a dish has been located in the receiving end of the collector 329—330, the interior of said dish becomes a form to confine and hold the next succeeding dish in proper form while the glue sets.

In practice a block may if desired be provided for use when the machine is started and which is slidable in the collector 329—330 and provided with a recess in the forward end corresponding to the interior form of a dish, and this block may be temporarily employed to receive the first made dish and to present sufficient resistance, while a stack of dishes is being accumulated, to insure a compact nesting. However the employment of such block is not necessary as after a few dishes have been formed and nested in the collector 329—330, a perfect recess of dish form is obtained and thereafter the dishes of the stack mutually co-operate to insure and maintain in each subsequently applied dish a recess of proper form to serve as a mold for holding the next applied dish in proper form.

In practice a stack of dishes is preferably maintained at all times in the collector 329—330, the attendant merely from time to time removing the outer end portion of the collected stack and leaving a substantial portion of the stack in the collector to provide a solid body against which to apply the newly formed dishes and insure compact nesting thereof.

While the glued portions of the blank are stuck together in the passage of the blank through the former 253—254, the glue is not set and the parts firmly united and it is the nesting of the dishes in compact relation in the collector 329—330 that is utilized to retain the newly formed dishes in proper shape and to hold the glued parts pressed firmly together until the glue sets. Therefore it is desired that the collector 329—330 be of a suitable length to retain at all times therein a sufficient quantity of dishes to insure a compact nesting and so that the time that it takes for a dish to progress in the collector 329—330 a distance equal to the length of the constantly retained portion of the stack is sufficient to insure thorough setting of the glue. Thus the dishes themselves serve to insure that the finished dishes are of uniform and proper shape and they also serve in effect as clamping means to hold the glued parts firmly together until they are permanently united by the setting of the glue.

For operating the picker mechanism to remove the dishes from the folder blocks 261 and stack them in the collector 329—330, the frame member 325 has an elevated bearing 338 for a shaft 339 which has a crank disk 340 secured on the inner end, and a link 341 has one end pivoted on the crank pin 342 of the disk 340 while the other end of said link is connected with the pivot pin 343 that extends laterally from the picker bar 331 at that side of the machine. On the outer end of the shaft 339 is secured a gear 344 which meshes with the gear 305 on the former block operating shaft 298, the ratio of said gears being such as to perform a dish pick off operation as each former block 261 emerges from the former 253—254 and the stroke of the link 314 being such as to insure a sufficiently accelerated movement of the picker claws 334 as compared with the rate of movement of the former blocks 261 so that removal of the dishes will be readily effected from the moving former blocks 261.

From the foregoing it will be obvious that after the paper strip 49 has been threaded through the machine and the lever 141 actuated to clutch the drive pulley 139 to the shaft 138, the paper strip will be fed continuously through the machine and as it passes through the various mechanisms above described will be coated with paraffin on the side that subsequently is to become the inside of the carton, except at the areas that are subsequently cut out to form the notches 90 as well as the areas 95 that are subsequently applied to the glued areas 197,—then after paraffining, the strip is scored and cut into the form of slightly connected butter dish blanks as shown in Figs. 22 and 23,—then provided with a coating of glue on the areas 197, then separated into blanks 89 that are folded into dish form with the portions 95 overlapping and stuck to the glued areas 197, and then nested in a compact stack which serves as a sort of mold to maintain the dishes in the proper shape and to hold the glued portions firmly together until the glue is set.

Referring now to Figs. 25 to 28 inclusive which show a plunger type of former that may be substituted for and used in place of the chain former mechanism of the previously described machine, the side frames 122 and 123 of the previously described machine are preferably formed at the delivery end of the machine as shown at 345 in Fig. 25 and have the brackets 198 mounted thereon and provided with gluing mechanism as well as blank separating and feeding rolls 251 and 252 all arranged and operated in the same manner as in the previously described machine, the only change in the previous machine, aside from the substitution of the plunger operated forming mechanism and the change in the ends of the side frames being the omission of the scoring members 42b from the roll 121 and the omission of the grooves 42c from the roll 120.

For mounting the plunger operated former a pair of brackets or pedestals 346 are mounted in laterally spaced relation on the base 43 between the ends of the frames 345 and these standards have angular top faces upon which are secured a former housing 347 into which the carton blanks 89 are fed by the feed wheels 251 and 252 in the same manner as in the previous construction. This former housing 347 is inclined upwardly as shown in Fig. 26 and has spaced side walls 349 with longitudinal slots 350 providing ways for a reciprocable carriage 351 which as shown in Fig. 27 has spaced front and rear rollers 352 and 353 respectively operating in the slots 350.

A form 354 corresponding in size and shape to the interior of the finished dish, one of which is shown in Fig. 30, is fixed on the forward end of the carriage 351, said form having top and bottom faces 355 against which the end walls of the dish are folded and side faces 356 against which the side walls of the dish are folded.

The main drive shaft 357 of the present machine, which corresponds to the drive shaft 138 of the previously described machine, does not extend through from side to side of the machine as in the previous construction but extends only about half way across and has secured on its inner end a crank disc 358 with a crank pin 359 upon which the end of a link 360 is pivoted, the forward end of this link being pivoted on the shaft 361 which extends from side to side of the carriage 351 and has the front rollers 352 mounted on the ends. The frame member 345 which is shown in Fig. 25 is, of course, provided with a bearing which is suitably extended at the inner side for this shaft.

The drive shaft 357 is geared to the cutter rolls 35 120 and 121 and other operative parts of the machine so that a blank is formed and separated from the leading end of the strip 49 at each revolution made by shaft 357 which said shaft by reason of the link connection 360 effects a complete forward and reverse movement of the form 354 each time a blank is formed.

The blank 89 is fed by the feed wheels 251 and 252 through the open top of the housing 347 to the position indicated in Fig. 26 at a place substantially midway between the ends of the range of movement of the form 354, the side walls 349 of the housing 347, at and beyond the place where the blank 89 is admitted, being provided with lining members 362, and at their rear ends these lining members 362 are provided on their inner faces with upper and lower cleats 381 in front of which the blank 89 is fed and by which it is held upright in position to be properly engaged by the form 354.

Immediately beyond the location of the blank 89 are upper and lower folding ribs 363 which are located midway between the side walls 349 of the former housing and are arranged so that as the blank 89 is moved upwardly by the form 354, they will fold the end portions 36ᵃ of the blank against the respective upper and lower faces 355 of the form. The ends of these ribs 363 that are next to the blank receiving position have the inner corners rounded as indicated at 364 to facilitate the folding operation, and these rib ends also cooperate with the cleats 381 to direct the incoming blank 89 to the proper position in the former housing.

Immediately beyond the folding ends of the ribs 363 the lining members 362 of the former housing side walls 349 are provided with upper and lower side folders 365 which are arranged respectively above and below the slots 350 and these side folders have curved forward edges 366 arranged so that just after the ends 36ᵃ of the blank 89 are folded down against the end faces 355 of the form, the side portions 39ᵃ of said blank are folded inwardly against the side faces 356 of the form.

Just beyond the place where the side folders 365 are effective to fold the side portions of the blank 89 there are located at the top and bottom of the former housing and at opposite sides of the ribs 363, right and left hand folding plates 367 and 368 the inner faces 369 of which slope from the line 370 (see Fig. 27) forwardly and inwardly, and these folding plates 367 and 368, after the turning in of the carton sides 39ᵃ, are engaged by the extensions 38ᵃ of the sides 39ᵃ and as these extensions or end tabs 38ᵃ move along the deflector faces 369 said extensions or tabs are turned inwardly against the end wall portions 36ᵃ of the blank and as the latter have the glued areas 197, the portions 95 of these extensions 38ᵃ are stuck to the outer sides of said end wall portions 36ᵃ.

The folded blank is then pushed by the form 354 beyond the ends of the formers 363, 365, 367 and 368 into a rectangular passageway 371 of a reduced portion 372 of the former housing which said passageway is slightly wider than the distance between the opposed side folders 365 and also slightly higher than the distance between the top formers 367, 368 and bottom formers 367—368 and the rear end portions of the former ribs 363 so that as the folded blank is pushed into the receiving end of the passageway 371 said folded blank expands slightly both transversely and longitudinally so that the edges thereof engage with the rear edges of the formers 363, 365, 367 and 368 and the folded dish is thus prevented from accidental retraction with the former 354.

The passageway 371, which is of a size to snugly confine the dishes is also of sufficient length to accumulate a stack therein which is gradually moved forwardly therethrough into a dish holding extension 373 consisting of four corner angles 374 which are secured together by spaced U-shaped straps 375 to form a skeleton frame of rectangular cross section with angular corner seats for the corners of the dishes, the inner end of this skeleton frame which is substantially horizontal, being curved downwardly and forming a continuation of the passageway 371 of the former housing.

For supporting the skeleton frame 373 a bracket 376 is secured to the standards 346 and extends outward under the straps 375 which are secured to the outer end of this bracket 376.

The bracket 293 of the first described machine is not used in the present machine to support the glue receptacle 199 but is replaced by a seat member 377 which is mounted on the top of the reduced portion 372 of the former housing and has the glue receptacle 199 secured thereto by bolts passing through the ears 295 of the glue receptacle.

Thus in the present machine the accumulation of the dishes in the passageway 371 offers a resistance to the admission of folded blanks into the receiving end of said passageway, with the result that the dishes are nested snugly and not only co-operate to retain their proper dish form but also by their compact relation serve to hold the glued portions firmly together until the glue has set.

As the dishes accumulate in the frame 373 of the present machine a batch thereof is grasped by the attendant from time to time and slid outwardly through the open end of the frame 373.

While I have shown and described my invention in a preferred form, I am aware that various changes and modifications may be made without departing from the principles of my invention, the scope of which is to be determined by the appended claims.

I claim as my invention:

1. The method of making containers of the class described which includes forming a continuously advancing strip of paper into successive partially severed blanks, each of which comprises a rectangular portion which subsequently constitutes the bottom of the container and has a marginal portion therearound slitted at the ends of the rectangular bottom portion to overlap and bend upwardly and form an upwardly extending wall around the bottom, applying a coating of adhesive to an area on one side of the moving strip along one side of each slit, then separating the strip into successive blanks and folding each separated blank into container form with the area that has been coated with adhesive overlapping an area of the blank at the opposite side of the respective slit, and then successively nesting the folded blanks and compressively uniting the said overlapped areas thereof in a progressively movable compactly maintained stack.

2. The method of making containers of the class described which includes forming a continuously advancing strip of paper into successive partially severed blanks, each of which comprises a rectangular portion which subsequently constitutes the bottom of the container and has a marginal portion therearound slitted at the ends of the rectangular bottom portion to contract and bend upwardly and form an upwardly extending wall around the bottom, applying a coating of paraffin to one side of the paper strip in a manner to leave an unparaffined area along one side of each slit, applying an adhesive coating to a corresponding area on the other side of the strip at the other side of each slit, then separating the strip into successive blanks and folding each separated blank into container form with the paraffin coating at the inside of the container and with each of the aforesaid unparaffined areas overlapping the aforesaid corresponding adhesively coated area at the opposite side of the respective slit, and then successively nesting the folded blanks and compressively uniting the said overlapped areas thereof in a progressively movable compactly maintained stack.

3. The method of making containers of the class described which comprises applying adhesive to selected areas of a continuously moving paper strip, and then, while the strip is continuously moving, successively separating and shaping successive blanks therefrom in tapered container form and thereafter affixing the adhesive areas of the blank to other adjoining areas thereof by compressively nesting the shaped blanks in a compact progressively moving stack.

4. The method of making containers of the class described which comprises cutting and scoring and partially separating a continuously moving strip of paper into successive blanks, applying adhesive to selected areas of said continuously moving strip, and then, while the strip is continuously moving, successively separating and shaping successive blanks therefrom in tapered container form and thereafter affixing the adhesive areas of the blank to other adjoining areas thereof by compressively nesting the shaped blanks in a compact progressively moving stack.

5. The method of making containers of the class described with flaring side and end walls, which comprises providing foldable paper blanks, applying adhesive to portions of the blank that subsequently overlap other portions of the blank, folding the blank into container form with said portions overlapped, and before pressing the overlapped portions together in permanent adhering relation, nesting the folded blank compactly between previously formed and subsequently formed blanks which compress said overlapping portions of the intermediate folded blank into permanent adhering relation.

6. The method of making containers of the class described having flared side walls permitting nesting of the containers within one another, which comprises successively folding paper blanks in the container form with portions of the side walls overlapped, successively nesting the folded blanks compactly in a stack, and adhesively securing the overlapped portions of the side walls together in the stack, said side walls being held in the folded form only at the outer edges until nested in the stack.

7. In an apparatus of the class described the combination of a former, a feeding device for supplying blanks to the former, means operable to apply adhesive to selected areas of the blank, said former comprising a continuously moving endless carrier with a plurality of blank pushers thereon and means with which said pushers cooperate to bend the moving blanks into the form of containers having tapered side walls with portions thereof located in position to unite with the adhesively coated areas, a magazine in which the folded blanks are accumulated, and means operable to remove the folded blanks from the moving pushers and to pack them in nested relation in the magazine.

8. In an apparatus of the class described the combination of a blank feeding device, means operable to apply adhesive to selected areas of the blank, a former to which the blanks are supplied by the feeding device and by which the blanks are bent into the form of containers with tapered side walls having portions thereof located in position to unite with the adhesively coated areas said former including a member for propelling the blanks in the forming operation, a magazine in which the folded blanks are accumulated, and means operable in the direction of and at a higher speed than the blank propelling member to transfer the folded blank from the said blank propelling member to the magazine.

9. The method of making a container of the class described with upwardly flared walls which comprises slitting and applying an adhesive at the sides of the slits in a continuously advancing strip of paper, successively separating container forming blanks from said continuously advancing strip, successively punching said blanks through an unobstructed zone of substantially the size of the finished container at the top and simultaneously folding edge portions of the blank inwardly to form the flared side walls of the container, then nesting the folded blanks in a stack and adhesively uniting overlapping portions of the side walls by compression in the stack.

10. In an apparatus for making containers with upwardly flared walls, the combination of a former having an unobstructed opening therethrough of substantially the size of the finished container at the top, a pair of folding ribs extending along opposite sides of said opening between folding members which have folding surfaces which are inclined inwardly toward and lengthwise of the respective rib, means for supplying blanks successively to one end of said opening, a plunger for pushing the blanks through said opening and means at the other end of said opening into which the blanks are nested in a stack by the plunger and in which said means overlapping side wall portions of the folded blank are adhesively united by compression.

ALBERT H. SCHMIDTKE.